US010838478B1

(12) United States Patent
Eswaran et al.

(10) Patent No.: US 10,838,478 B1
(45) Date of Patent: Nov. 17, 2020

(54) POWER SYSTEM

(71) Applicant: Bretford Manufacturing, Inc., Franklin Park, IL (US)

(72) Inventors: Shankar Eswaran, Tamil Nadu (IN); Senthilkumar Vaiyapuri, Tamil Nadu (IN)

(73) Assignee: Bretford Manufacturing, Inc., Franklin Park, IL (US)

(*) Notice: Subject to any disclaimer, the term of this patent is extended or adjusted under 35 U.S.C. 154(b) by 323 days.

(21) Appl. No.: 15/974,868

(22) Filed: May 9, 2018

Related U.S. Application Data

(63) Continuation-in-part of application No. 15/789,356, filed on Oct. 20, 2017, now Pat. No. 10,283,952.

(60) Provisional application No. 62/523,560, filed on Jun. 22, 2017.

(51) Int. Cl.
| | | |
|---|---|---|
| *G06F 1/3203* | (2019.01) | |
| *G06F 1/20* | (2006.01) | |
| *G06F 1/3231* | (2019.01) | |
| *G06F 1/3234* | (2019.01) | |

(52) U.S. Cl.
CPC ............ *G06F 1/3203* (2013.01); *G06F 1/206* (2013.01); *G06F 1/3231* (2013.01); *G06F 1/3234* (2013.01)

(58) Field of Classification Search
CPC ...... G06F 1/3203; G06F 1/206; G06F 1/3231; G06F 1/3234
See application file for complete search history.

(56) References Cited

U.S. PATENT DOCUMENTS

| | | | |
|---|---|---|---|
| 7,172,196 B2 | 2/2007 | Randall | |
| 7,932,638 B2 | 4/2011 | Randall | |
| 7,982,436 B2 | 7/2011 | Randall | |
| 7,986,059 B2 | 7/2011 | Randall | |
| 8,081,408 B2 | 12/2011 | Randall | |
| 9,432,298 B1* | 8/2016 | Smith | ................ H04L 49/9057 |
| 2005/0230609 A1 | 10/2005 | Randall | |
| 2006/0022656 A1* | 2/2006 | Leung | ............... H02M 3/33515 |
| | | | 323/283 |
| 2009/0072782 A1 | 3/2009 | Randall | |
| 2009/0236140 A1 | 9/2009 | Randall | |
| 2009/0243396 A1 | 10/2009 | Randall | |
| 2009/0278494 A1 | 11/2009 | Randall | |

(Continued)

FOREIGN PATENT DOCUMENTS

WO    WO2016/007884    1/2016

*Primary Examiner* — Jeffrey A Gblende
*Assistant Examiner* — Kevin H Sprenger
(74) *Attorney, Agent, or Firm* — Anderson Gorecki LLP

(57) ABSTRACT

A power system includes a power controller, an input power module for receiving AC power from a wall mains, a power driver electrically connected to the input power module to receive the AC power from the input power module, convert the AC power to low and medium voltage DC power, and selectively output the low or medium DC power under the control of power controller, and an output power module for providing DC power to a charging track with exposed electrical contacts along an upper surface. The power controller includes a microcontroller unit having software embedded therein to implement a control application that includes a main function loop, including a state machine operable to cycle through dither task states and drive states to test conditions of the power system and the track.

18 Claims, 14 Drawing Sheets

(56) References Cited

U.S. PATENT DOCUMENTS

| | | |
|---|---|---|
| 2010/0022285 A1 | 1/2010 | Randall et al. |
| 2010/0055928 A1 | 3/2010 | Randall |
| 2010/0102789 A1 | 4/2010 | Randall |
| 2010/0156197 A1 | 6/2010 | Randall |
| 2011/0133655 A1* | 6/2011 | Recker .................. H05B 47/16 315/159 |
| 2011/0210617 A1 | 9/2011 | Randall |
| 2013/0121049 A1* | 5/2013 | Shi ................... H02M 3/33507 363/89 |
| 2013/0193879 A1* | 8/2013 | Sadwick ............. H05B 45/382 315/307 |
| 2016/0329746 A1 | 11/2016 | Hewelt |
| 2017/0133842 A1* | 5/2017 | Freeman .................. H02J 1/00 |

* cited by examiner

POWER SYSTEM

CROSS-REFERENCE TO RELATED APPLICATIONS

This application claims priority to U.S. Provisional Patent Application No. 62/523,560, filed Jun. 22, 2017, entitled Portable Floor Power System, the content of which is hereby incorporated herein by reference. This application is related to U.S. patent application Ser. No. 15/789,356, filed Oct. 20, 2017, entitled Rapidly Deployable Floor Power System, the content of which is hereby incorporated herein by reference.

BACKGROUND

This disclosure relates to power distribution systems and, more particularly, to a power system for use with a rapidly deployable floor power system.

SUMMARY

All examples and features mentioned below can be combined in any technically possible way.

In one aspect, a power system includes a power controller, an input power module for receiving AC power from a wall mains, a power driver electrically connected to the input power module to receive the AC power from the input power module, convert the AC power to low and medium voltage DC power, and selectively output the low or medium DC power under the control of power controller, and an output power module for providing DC power to a charging track with exposed electrical contacts along an upper surface. The power controller includes a microcontroller unit having software embedded therein to implement a control application including a main function loop, a class B safety test task, a POST hardware diagnostic test task, a dither task, a power management task, and an object sensing task.

In some embodiments, the main function loop includes a state machine operable to cycle from a dither task initialization state, to a dither task no-load condition state, to a drive task initialization state, to a drive task load condition state, to a wait/fault state, and back to the dither task initialization state.

In certain embodiments, the state machine is operable to transition from the dither task no-load condition state to the wait/fault state if an object is sensed on the track while the main function loop is in the dither task no-load condition state.

In some embodiments, the state machine is operable to transition from the dither task no-load condition state to the drive task load condition state if a connector is sensed on the track while the main function loop is in the dither task no-load condition state.

In certain embodiments, while in the dither task no-load condition state, the power controller controls the power driver to drive a low DC voltage on the track to check for the presence of a connector by iteratively turning the low voltage on for a first ON period and then turning the low voltage off for a second OFF period, and sensing electrical characteristics of the track during the OFF periods.

In some embodiments, while in the drive task load condition state, the power controller controls the power driver to drive a medium DC voltage on the track to check for the presence of a connector, an object, or a human touch, by iteratively turning the medium voltage on for a first ON period and then turning the medium voltage off for a second OFF period, and sensing electrical characteristics of the track during the OFF periods.

In certain embodiments, the state machine is operable to transition from the drive task load condition state to the wait/fault state if an object or a human touch is sensed on the track while the main function loop is in the drive task load condition state, and the state machine is operable to remain in the wait/fault state for a wait period and then transition to the dither task no-load condition state.

In some embodiments, the state machine is operable to remain in the wait/fault state for a first wait period when an object is sensed on the track and is operable to remain in the wait/fault state for a second wait period if the human touch is sensed on the track, the first wait period is a different amount of time than the second wait period.

In certain embodiments, the state machine further includes a system error state, and the state machine is operable to transition from the drive task load condition state to the system error state if the object has been sensed on the track for a predetermined number of contiguous state cycles.

In some embodiments, the state machine is operable to transition from the drive task load condition state to the wait/fault state if an overcurrent condition is sensed on the track while the main function loop is in the drive task load condition state, and the state machine is operable to remain in the wait/fault state for a wait period and then transition to the dither task no-load condition state.

In certain embodiments, the state machine further includes a system error state, and the state machine is operable to transition from the drive task load condition state to the system error state if the overcurrent condition has been sensed on the track for a predetermined number of contiguous state cycles.

In some embodiments, the state machine is operable to transition from the drive task load condition state to the wait/fault state if a voltage irregularity is sensed in the power system while the main function loop is in the drive task load condition state, and the state machine is operable to remain in the wait/fault state for a wait period and then transition to the dither task no-load condition state.

In certain embodiments, the state machine further includes a system error state, and the state machine is operable to transition from the drive task load condition state to the system error state if the voltage irregularity has been sensed in the power system for a predetermined number of contiguous state cycles.

In some embodiments, the voltage irregularity is a low or high input voltage at the input power module.

In certain embodiments, the voltage irregularity is a low or high output voltage at the output power module.

In some embodiments, the main function loop further includes a system idle state, and the state machine is operable to transition from any one of the other states to the system idle state upon detection of a high temperature of the power system.

In certain embodiments, the main function loop further includes a system error state, and the state machine is operable to remain in system error state until power to the power system has been turned off and then turned back on.

DETAILED DESCRIPTION

Electronic devices require access to power to operate. While many devices have batteries, having an available source of power to recharge the batteries is often desirable. Unfortunately, available power sources are often inconveniently located, particularly in public spaces. For example, people attending a conference may be seated in a conference room away from any wall where power might normally be available. Similarly, students may be seated in a classroom away from any available power source. Since extension cords are tripping hazards, running extension cords into the interior area of a room is often an impractical solution to providing power toward the middle areas of the room. While it may be possible to permanently install electrical outlets within the space, doing so takes time and often takes considerable cost/effort. Likewise installing temporary power often involves taping or otherwise securing loose wires to the floor, which can be unsightly and time consuming.

As described in co-pending U.S. patent application Ser. No. 15/789,356, one way of making power more readily accessible is to provide a power system with an exposed track 14 that has traces 15 (exposed electrical contacts) along its top surface. A puck 18, referred herein as a "puck" can connect to the track at any location along its length, thus providing a convenient power source for example to power mobile electronic devices such as mobile phones, tablet computers, and laptop computers.

Figure 1:
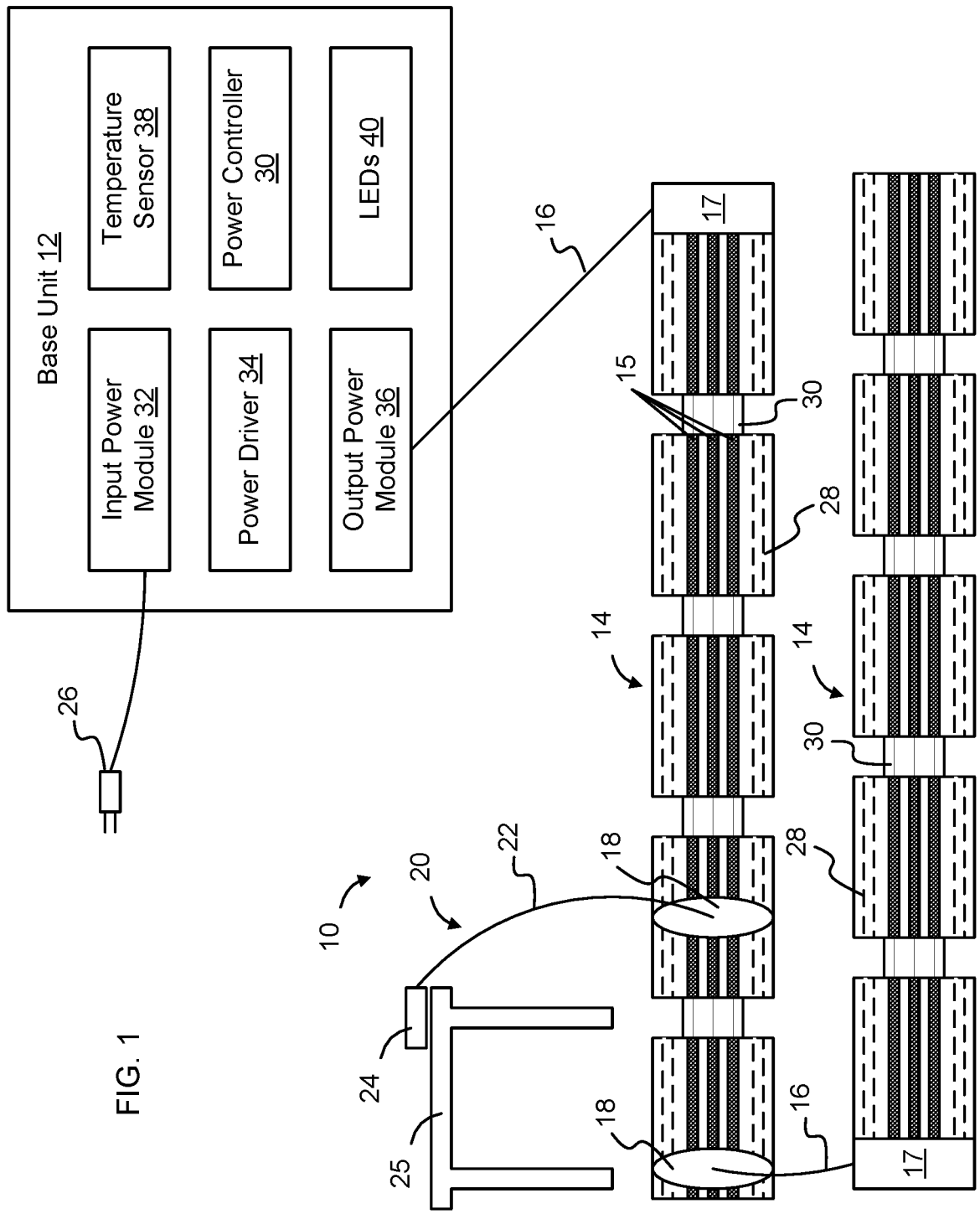
FIG. 1 is a functional block diagram of a power system according to some embodiments.

FIG. 1 is a functional block diagram of a power system 10 according to some embodiments. As shown in FIG. 1, in one embodiment the power system 10 includes a base unit 12 and one or more lengths of power track 14 having exposed electrical contacts 15 along its length. At least two of the exposed electrical contacts 15 on track 14 are of opposite electrical polarity (positive, neutral) to enable the exposed electrical contacts to supply DC power to devices in electrical contact with at least two of the opposed polarity exposed electrical contacts 15. Although the track 14 in FIG. 1 is illustrated as being foldable, in some embodiments the track is not foldable and is formed of one or more solid pieces that are connected to the base unit 12 directly or are daisy-chained together to electrically interconnect with the base unit.

In some embodiments, the base unit 12 and track 14 are connected by a track power cable 16. In some embodiments, track power cable 16 is connected to base unit 12 using a magnetic connector so that the power cable 16 is easily disconnected from base unit 12 to prevent power cable 16 from being a tripping hazard.

The power system also includes one or more power distribution systems 20, each of which includes a power distribution cable 22 connected between a power distribution unit 24 on one end and to a connector puck 18 on the other end. In FIG. 1, the power distribution unit 24 is shown sitting on top of a desk 25. In some embodiments the power distribution unit 24 has a set of USB ports or other power ports to provide power to attached electrical devices.

In some embodiments, connector puck 18 is designed to electrically connect to traces 15 on track 14 to receive power from track 14. In some embodiments puck 18 includes magnets to magnetically hold puck 18 on track 14 to ensure that the puck is correctly aligned with the traces 15 on the track 14 and to hold the puck 18 securely against the top surface of the track 14.

Although FIG. 1 shows power distribution unit 24 connected to puck 18 by power cable 22, in some embodiments, the power distribution system 20 includes a power distribution unit 24 that has the connection surface of puck 18 formed on its lower surface, such that the power distribution unit 24 has the electrical contacts of puck 18 and magnets, to enable the power distribution unit 24 to directly connect to the electrical traces 15 of the track 14. In this embodiment, power distribution unit sits directly on track 14 to receive power from the track.

In some embodiments, mains electricity, e.g. 110V/220V AC power, is supplied to the base unit 12 from a standard power outlet via power cord 26. Base unit 12 converts AC power received on power cord 26 into DC power, and outputs the DC power to the foldable 14 via track power cable 16. In some implementations the track power cable 16 is on the order of two feet in length, although other lengths may be used depending on the implementation. In some implementations, base unit 12 outputs DC power to the exposed electrical contacts 15 of track 14 at between 34.5 and 38 volts and up to 8.33 amps, for a total available power of up to 300 Watts on track 14.

As shown in FIG. 1, in some embodiments base unit 12 includes a collection of functional modules to enable the base unit to receive power on power cord 26 and supply DC power to the track 14. For example, in some embodiments, base unit 12 includes power controller 30, for example as described below in connection with FIGS. 2-13. The power controller 30 is configured to prevent a person from receiving an electrical shock if the person contacts both positive and neutral exposed electrical contacts 15 of track 14, and to cease output of electrical power to the track 14 in the event a conductive object comes into contact with both positive and neutral exposed electrical contacts 15. In some embodiments the power controller 30 is implemented using a microcontroller unit running Microchip Class B safety software routines that are tested on the microcontroller unit each time the system is started, and the hardware complies with UL60730-1-4$^{th}$ edition.

In some embodiments, base unit 12 includes input power module 32 to receive electrical power, for example from a wall mains electrical source 26. A power driver 34 conditions power for example by converting 110/240V AC power received at input power module 32 to 34.5-38V DC power that is provided to output power module 36. In some embodiments, output power module 36 has one or more switches under the control of power controller 30 to selectively provide DC power to track 14 on track power cable 16.

In some embodiments, the power controller 30 is configured to perform pulse width modulation of power supplied to track 14, and turns off power to the track when electrical fault conditions are detected. For example, as described in greater detail below, power controller 30 executes firmware to control output power module to detect short/touch events on the track and to turn off power to the track to prevent power from being supplied under these conditions or where no puck 18 is attached to the track 14. Although input power module 32, power driver 34, and output power module 34 are shown in FIG. 1 as separate functional blocks, in some embodiments, input power module 32, power driver 34, and output power module 36 are implemented as a single power supply module.

In some embodiments, power controller 30 is in electrical communication with temperature sensor 38 to detect an inside temperature of the enclosure of the base unit 12. In some embodiments, the base unit 12 includes one or more LEDs 40 under the control of the power controller 30 to enable the status of the base unit to be discerned. For example, different LEDs or different LED blink patterns may be used to indicate that the base unit is ready, in use, is idle due to overheating, or has experienced an error and must be restarted. Other modules may be included as well in the base unit, but these modules have been identified since the operation of these modules is discussed in greater detail below.

Figure 2:
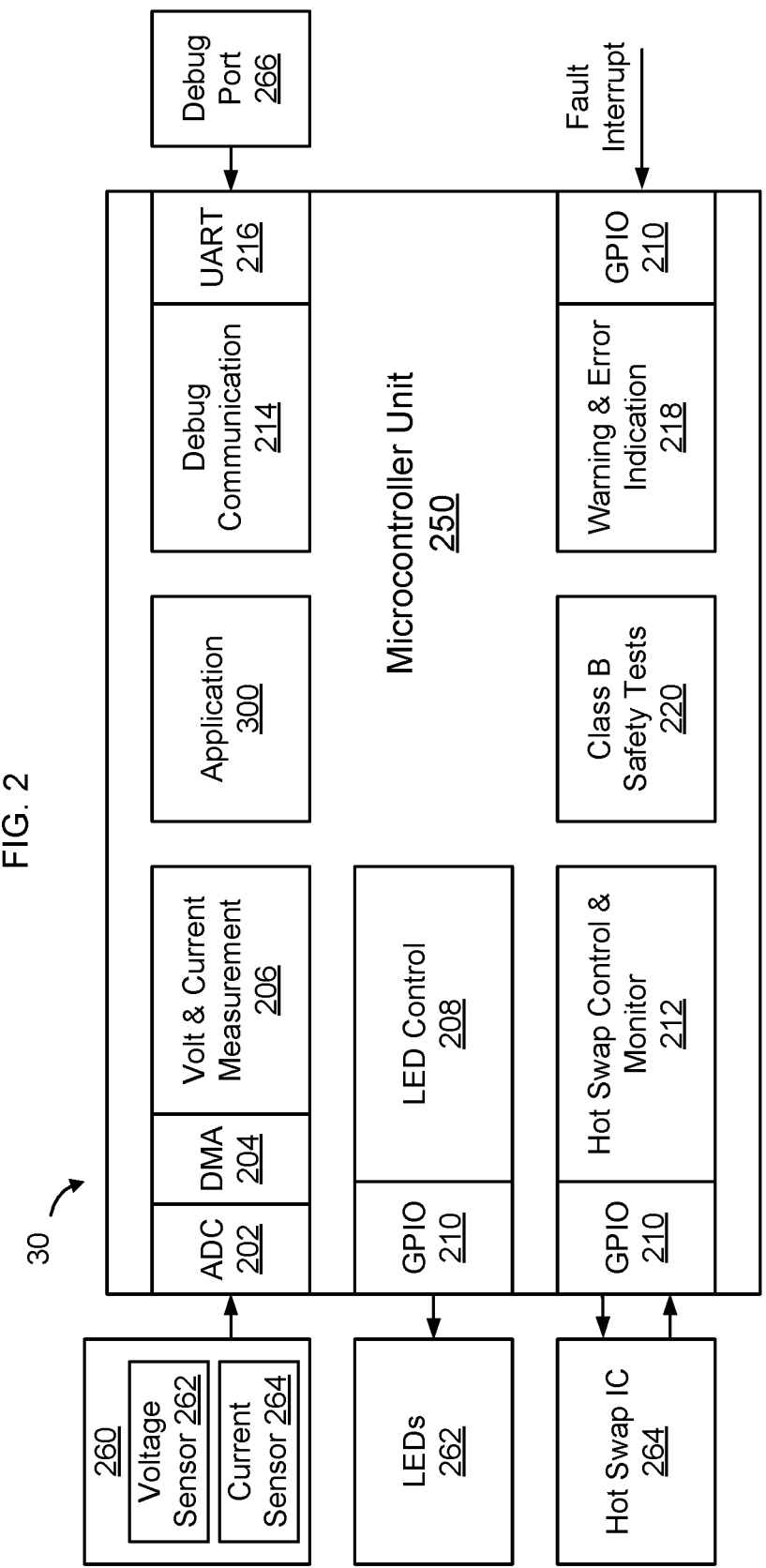
FIG. 2 is a functional block diagram of a set of connected components configured to implement aspects of the power system of the base unit according to some embodiments.

FIG. 2 is a functional block diagram of a set of connected components configured to implement aspects of the power system of the base unit 12 according to some embodiments. In some embodiments, a set of example software modules are implemented as control instructions running on microcontroller unit 250 interconnected with a set of microcontroller peripherals. Application 300 provides overall control of execution of the functions of microcontroller unit 250 and is described in greater detail below in connection with FIGS. 3-12. Control instructions, in some embodiments, are implemented as firmware running on microcontroller 250.

In some embodiments, a first microcontroller peripheral is a hot swap/PAD sensing circuit 260. The hot swap/PAD sensing circuit 260 has voltage sensors 262 and current sensors 264 that sense the voltages and currents values. Example voltage and currents may include input voltage and current values output voltage and current values, POST voltage levels, signals provided by temperature sensor, etc. Signals from hot swap/PAD sensing circuit 260 are received by microcontroller at analog to digital converter 202 which converts analog voltage and current levels from voltage sensors 262 and current sensors 264 to digital values. The digital values from the ADC are stored using a Direct Memory Access (DMA) channel 204. Once all data is stored in memory, a DMA transfer complete interrupt will be generated to trigger voltage and current measuring process 206 to interpret the data stored in memory.

In some embodiments, a second microcontroller peripheral is a set of LEDs 262. Operation of the LEDs 262 can be controlled by an LED control process 208 using a General-Purpose Input Output (GPIO) 210. Example operations may include turning LEDs on, off, or causing the LEDs to blink. One example set of LED signals that may be used in some embodiments is set forth below in connection with Table I, although other LED indications may of course be used.

In some embodiments, a third microcontroller peripheral is a Hot Swap integrated circuit (IC) 264. Hot swap IC 264 can be controlled by a hot swap control and monitor process 212 via GPIO 210. In some embodiments, Hot swap IC provides drive power to track 14.

In some embodiments, a fourth microcontroller peripheral is a debug port 266. debug port 266 can be controlled by a debug communication process 214 via Universal Asynchronous Receiver-Transmitter (UART) 216.

In some embodiments, a warning and error indication process is configured to receive a fault interrupt via GPIO 210.

In some embodiments, a Class B safety test process 220 is provided. Operation of the Class B safety test process 220 is described in greater detail below in connection with FIG. 13.

Figure 3:
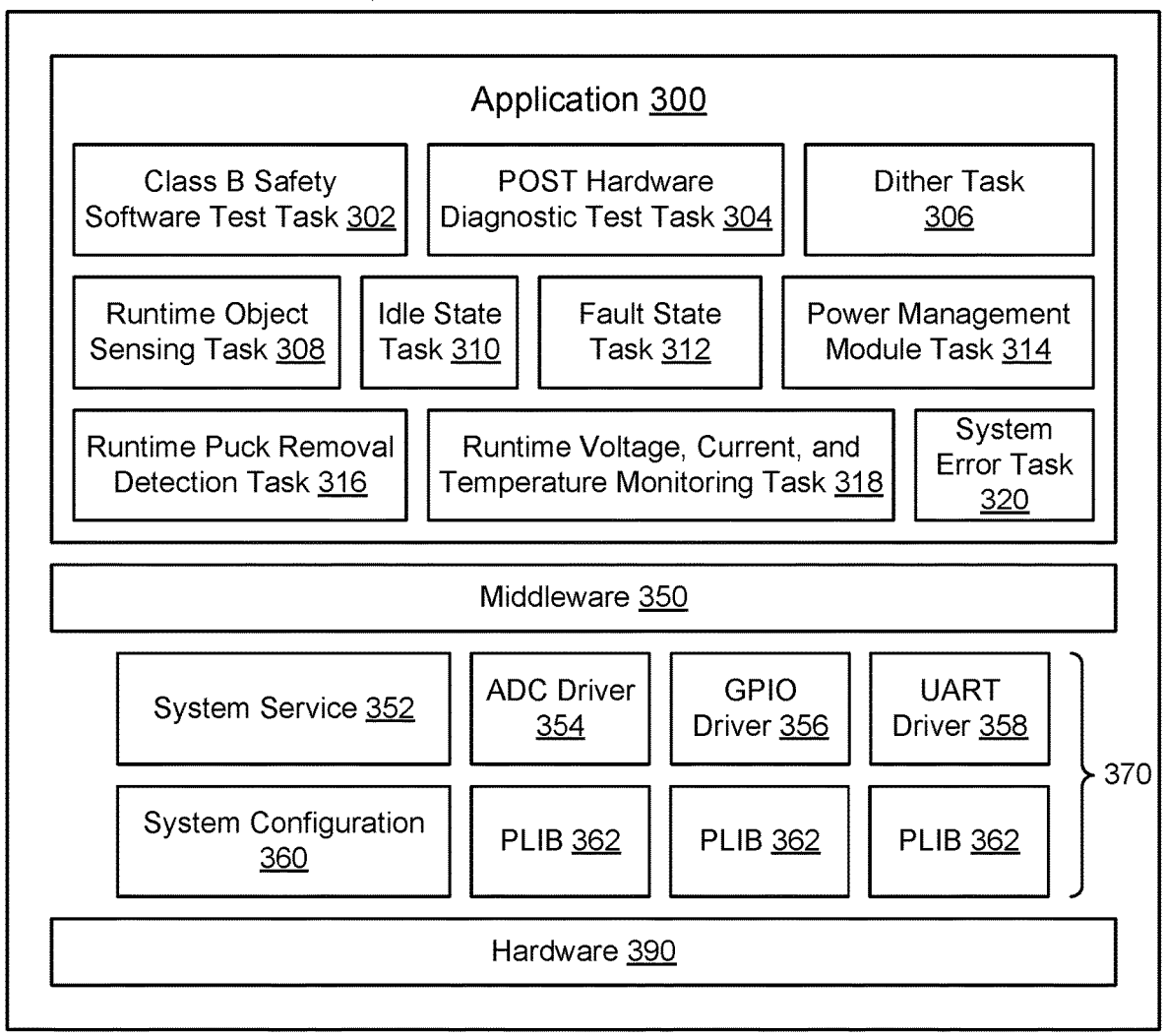
FIG. 3 is a functional block diagram of an example software architecture for the power controller according to some embodiments.

FIG. 3 is a functional block diagram of an example software architecture for the power controller 30. As shown in FIG. 3, in some embodiments an application 300 is implemented to run on middleware 350 and middleware modules 370 that abstract the underlying hardware 390. Example middleware modules 370 may include system service module 352, drivers 354, 356, 358, system configuration file 360, and a set of peripheral libraries (PLIBs) 362 that collectively abstract the underlying hardware 390 from the application 300. In some embodiments the middleware 350 and middleware modules are implemented using the MPLAB Harmony Software framework, which provides a holistic, aggregate approach to creating firmware solutions for embedded systems using Microchip PIC32 microcontrollers. The MPLAB Harmony software framework consists of portable, modular and compatible libraries provided by Microchip and third-party ecosystem partners.

Middleware 350, in some embodiments, is built as a set of libraries that are built upon device drivers and system services so that they can be supported on any microchip microcontroller for which the required driver or service is supported. In some embodiments, drivers, certain services, and various modules within the middleware may be integrated into the middleware stack 350 for efficiency.

The primary purpose of a device driver (or "driver") is to provide a simple and highly abstracted interface to a peripheral, allowing application 300 (or other module in the system) to interact with the peripheral through a consistent set of functions. A device driver is responsible for managing access to the peripheral, so that requests from different modules do not conflict with each other, and for managing the state of that peripheral so that it always operates correctly. As shown in FIG. 3, in some embodiments the power system 10 includes an ADC driver 354 to interface with the Analog to Digital Converter (ADC) which is used to convert analog signals from the voltage and current sensors into digital form.

In some embodiments the power system includes a GPIO driver 356 which enables the power system 10 to use the GPIO pins on the microcontroller. In some embodiments the power system includes a Universal Asynchronous Receiver-Transmitter (UART) driver 358 which enables the power system 10 to use the UART on the microcontroller. Although separate drivers 354, 356, 358 are shown in FIG. 3, in some embodiments one or more shared drivers may be used to combine the functions of drivers 354, 356, 358. Where the power system has additional functions that need to be controlled, additional drivers may likewise be provided depending on the implementation.

System services 352, like the drivers 354, 356, 358, are responsible for managing shared resources so that other modules (drivers, middleware, and applications) do not conflict on shared resources. The use of system service 352 is very similar the use of a device driver, except that a driver normally requires the caller to "open" it to create unique client-to-driver association. A system service does not normally require the caller to open the service before using it, because system services are frequently shared by many clients with in the system.

A Peripheral Library (PLIB) is a simple access library that provides a consistent (but very low level) interface to a peripheral that is available to the microcontroller. PLIBs hide register details, making it easier to write drivers that support multiple microcontroller families, but they are not normally used by applications directly to interact with peripherals, as they provide little abstraction, and because they require the caller to manage the detailed operation of a peripheral (including preventing conflicting requests from other modules). Because of the lack of conflict protection in a PLIB, only one module in a system should directly access the PLIB for a peripheral. Therefore, PLIBs are primarily used to implement device drivers (and some system services) to make them portable. Although the implementation shown in FIG. 3 includes three PLIBs 362, other numbers of PLIBs may be used depending on the implementation.

The system configuration module 360, in some embodiments, includes user defined files, including a main system configuration file specifying a set of configuration options supported by the libraries. The main system configuration file will call the configuration file of each library. A system initialization function is called from the main system configuration file to initialize the processor configuration bits and system-wide global data structures.

In some embodiments, the main system configuration also provides the entry point for application 300 to interact with the underlying hardware. In some embodiments, all tasks of the software are implemented as loops that operate within a super loop implemented by the main system configuration file. Each of the tasks, labeled 302-320 in FIG. 3, will be described in greater detail below.

In some embodiments, the first thing the main function of application 300 does is call a function to initialize the system. The purpose of the initialization function is to initialize each software module of the system. In some embodiments, the middleware 350 and middleware modules 370 are based upon a model of cooperating state machines. So, the initialization function must ensure that every module's state machine is placed in a valid initial state. The manner in which the system initialization function operates will depend on the set of software modules within application 300 and the order in which the various modules is initialized may be adjusted depending on the implementation.

Once all the software modules in the system have been initialized, the "main" function executes an infinite loop to keep the system running. This is referred to herein as a "super loop" as it is the outer-most loop, within which the entire system operates. This loop never exits. So, the code that exists after the end of that loop is not executed, but rather may optionally be included for safety, clarity, and syntactical completeness.

Within the super loop, in some embodiments, the "main" function calls the system status function. The purpose of the system status function is to poll every module in the system to ensure that it continues to operate. This is how the system maintains the state machine of all polled modules. In some instances, particular modules may be interrupt driven and thus, not called from the system status function. The implementation of the system status function, in some embodiments, is implemented as part of the system configuration.

As shown in FIG. 3, in some embodiments the application 300 includes multiple software modules 302-320. In some embodiments, the application includes a Class B safety software test module 302 configured to perform Class B safety tests. This module is described in greater detail below in connection with FIG. 13. In some embodiments, the application includes an POST hardware test task 304 to perform POST hardware diagnostic tests. This module is described in greater detail below in connection with FIG. 14.

In some embodiments, the application includes a dither task 306 configured to detect whether puck 18 is connected to track 14. In some embodiments, the dither tack 306 is configured to toggle power on/off to the track at a very low voltage under no load conditions. For example, the dither power on/off timing mechanism in some embodiments switches power to the track 14 on for a short period such as for 1.110 ms, and then switches the power to the track 14 off for 1.110 ms, repeatedly. During this task the drive pin task is turned off to prevent charging voltage from being applied to the track. During the ON portion of the ON/OFF cycle, the dither task performs (1) an input voltage test for over and under voltage, (2) a foreign object detection test using dither drive, (3) a connector detection test, i.e. by looking for a particular electrical signature from the puck 18 on track 14, and (4) tests whether the dither pin is enabled. During the OFF portion of the ON/OFF cycle, the dither task detects that the dither pin is disabled. The system will remain in dither state until a valid puck 18 is detected on the track 14.

If a puck 18 is detected by the dither task during a no-load condition, the system transitions to the drive task which causes power to be applied to the track 14. If any object is detected during the dither task it stops the dither pin toggle task, sets the error LED indications and jumps to fault state for a predefined wait time. The predefined wait time specifies how long the system will stay in fault state. Once if the wait time expires, the dither task clears the previous registers and starts the dither task. If at least one puck is detected on the track by the dither task, the system will transition to drive task to supply power on the track.

In some embodiments, the application 300 includes a run time power lane object sensing task 308, which enables the power system 10 to test for shorts and foreign objects on the track 14. The power lane object sensing task 308 operates only in load condition since, as discussed above, the dither task 306 performs this function under no load conditions.

In some embodiments, when the track 14 is under load conditions, power is supplied to the track for a period of time (ON period) and then is turned off for a short period (OFF period), during which the power lane object sensing task 308 detects whether there is a short between the exposed electrical contacts 15 of the track 14. In some embodiments, power is turned ON for a period of 2.5 ms and then switched OFF for 14 μs, repeatedly. During the OFF period, the voltage on the track 14 is sensed to detect whether there is a short or an object on the track 14. If any object is detected during the OFF period, the power lane object sensing task 308 stops the drive pin task to stop application of power to the track 14, sets the error LED indicators, and jumps to fault state for a predefined wait time. The wait time defines how long the system will stay in fault state. Once the wait time expires, the power lane object sensing task 308 clears the previous registers and starts the dither task.

In some embodiments, the power lane object sensing task 308 detects for shorts on the track 14 by:
Switching OFF the drive pad;
Enabling the clamp pin to reduce the voltage on the drive pad;
Waiting for 9 μs for the voltage to settle down;
Enabling the PMM dither pin;
Waiting for 7 μs for the voltage settle down;
Reading the lane voltage from the ADC buffer to determine if the lane voltage is within an expected range. For example, without a load on the track an example expected lane voltage (voltage on traces 15 of track 14) may be expected to be in the range of be between 1.09V-1.46V. With load on the track (puck 18 connected to track 14), an expected lane voltage may be in the range of between 1.22V-2.19V. Other voltage ranges will depend on the particular implementation.

Checking whether voltage levels are outside of the expected range for a predetermined number of consecutive ON/OFF cycles, such as for example 10 ON/OFF cycles. If the voltage is within the expected range, the drive task will continue. If the voltage is outside of the expected range, the run time power lane object sensing task will transition to a fault state for the predefined wait period. If the voltage levels haven't been outside of the expected range of voltage cycles for the predetermined number of consecutive ON/OFF cycles, at the end of the wait time the application will start the dither task 306. If the voltage levels have been outside of the expected voltage range for a given number of consecutive ON/OFF cycles, the application will transition to system error state. In system error state, in some embodiments, the application 300 will stop applying power to the track and alert the user by causing the red LED on the base unit 12 to blink.

In some embodiments, the application 300 includes an idle state task 310. The idle state task 310, in some embodiments, is used to suspend operation of the power system when the temperature inside the base unit enclosure is too high. When the temperature is too high, the idle state task 310 will turn off power to the track 14 and will control operation of the fan until the system temperature returns to a normal level. The idle state task 310 will also manage the status LEDs while the power controller is in the idle state. Once the system enters to idle state, it will not enter into other state until the system temperature returns to a normal level.

In some embodiments, the application 300 includes a fault state task 312. If any fault occurs during normal operation or during the dither task, the system will stop the drive operations and jumps to the fault state and wait for a predetermined period (wait period) and indicate a fault status using the LEDs. Once the wait time expires, the fault state task 312 clears the previous registers and starts the dither task for all operations. In fault state the system will do common operations like heart beat LED tasks, Watch Dog Timer (WDT) reset pin toggle, fault LED task, and enclosure temperature monitor and fan control. In some embodiments, different predetermined wait periods are used by the fault state task 312 depending on the type of fault and depending on the previous state of the system. Thus, for example, a first wait period may be used by the fault state task if an object is detected on the track when the system is in dither state than if the object is detected on the track when the system is in drive state.

In some embodiments, the application 300 includes a Power Management Module (PMM) task 314. In some embodiments, the PMM task 314 is programmed to turn drive power ON/OFF to the track 14. In some embodiments, the PMM task 314 controls drive power such that power is switched ON to the pad drive (connected to track 14) for 2.5 ms and then power is switched OFF for 14 µs repeatedly. While drive power is being supplied to the track (during the ON period), the PMM task 314 performs an input voltage test to detect over and under voltage conditions. The PMM task 314 also performs a PMM output current consumption test and a PMM output voltage test for over and under voltage conditions. The PMM task 314 also looks to determine if the puck 18 is removed from the track 14 and performs temperature management. During the period of time when driving power is not being supplied to the track (during the OFF period), the PMM task 314 checks for foreign objects on the track 14 using the dither task 306 described above. In some embodiments, the PMM task 314 includes debug port software functions, to enable status, warnings, and errors to be printed at the debug port. POST heart beat LED software functions are used for indicating the status of the board.

In some embodiments, the application 300 includes a puck removal detection task 316. The puck removal detection task 316 checks for removal of the puck 18 from the track 14 during normal operation, while drive power is being applied to the track 14. This task checks for the presence of a puck 18 on the track 14 during the ON period (when the PMM task 314 has power applied to the track 14). If no puck 18 is found on the track 14, the system automatically jumps to fault state for a predefined wait period. The wait period defines the length of time the system will stay in the fault state. Once if the wait time expires it clears the previous registers and starts the dither task 306 and continue the puck detection task.

In some embodiments, the application 300 includes a runtime voltage, current, and temperature monitoring task 318. In some embodiments, the runtime voltage, current, and temperature monitoring task 318 is programmed to perform a runtime output voltage test. In some embodiments, the runtime output voltage test detects for over and under output voltage conditions on the exposed electrical contacts 15 of track 14 during the ON time period of drive pad pulse. If an over or under voltage condition is detected during the ON period for 10 consecutive ON/OFF cycles, the software immediately cuts off the system and the enters into fault state for a predefined wait period. After the wait period, the system resets and restarts. If an error occurs more than 5 consecutive times, the system will enter into system error state which will keep the system in error state until the system power is reset.

When an over voltage condition is detected on track 14, for example if the voltage detected on one or more of the exposed electrical contacts 15 is greater than a maximum value of a defined voltage range (e.g. 38V), the software will stop applying power ON/OFF to the track 14, turn off the green LED, start blinking the red LED, and set the PMM task 314 state to fault state. When an under-voltage condition is detected on track, for example if the voltage detected on one or more of the exposed electrical contacts 15 is less than a minimum value of a defined voltage range (e.g. 34.5V), the software will stop applying power to the track 14, turn off the green LED, start blinking the red LED, and set the PMM task 314 state to fault state. When normal voltage conditions are detected, for example if the voltage detected on an exposed electrical contact 15 is greater than a minimum value of a defined voltage range (e.g. 34.5V) and less than a maximum value of the defined voltage range (e.g. 38V), the software will continue applying power ON/OFF to the track 14 and activate the various LEDs (green, orange, red) depending on the amount of detected load on the track 14.

In some embodiments, the runtime voltage, current, and temperature monitoring task 318 is programmed to perform a runtime input voltage test. This test detects for over and under input voltage conditions. When the input voltage, for example if the input voltage to a Switched Mode Power Supply (SMPS), is greater than a maximum value of a defined voltage range, the software will stop applying power ON/OFF to the track 14, turn off the green LED, start blinking the red LED, and set the PMM task 314 state to fault state. When the input voltage, e.g. the input voltage to the SMPS, is less than a minimum value of a defined voltage range, the software will stop applying power ON/OFF to the track 14, turn off the green LED, start blinking the red LED, and set the PMM task 314 state to fault state. If an over or under input voltage condition is detected during the ON period for 10 consecutive ON/OFF cycles, the software immediately cuts off the system and the enters into fault state for a predefined wait period. After the wait period, the system restarts. If an input voltage error occurs more than 5 consecutive times, e.g. after entering fault state five consecutive times, the system will enter into system error state which will keep the system in error state until the system power is reset.

In some embodiments, the runtime voltage, current, and temperature monitoring task 318 is programmed to perform a runtime output current test. This module detects for an over current condition on the exposed electrical contacts 15 of track 14 during the ON time period of drive pad pulse. If an over current condition is detected during the ON period for 10 consecutive ON/OFF cycles, the software immediately cuts off the system and the enters into fault state for a predefined wait period. After the wait period, the system resets and restarts. If an input voltage error occurs more than 5 consecutive times, the system will enter into system error state which will keep the system in error state until the system power is reset.

When an over current condition is detected on track 14, for example if the current on one or more of the exposed electrical contacts 15 is greater than a maximum value of a defined current range (e.g. 8.33 A), the software will stop applying power ON/OFF to the track 14, turn off the green LED, start blinking the red LED, and set the PMM task 314 state to fault state.

In some embodiments, the runtime voltage, current, and temperature monitoring task 318 is configured to calculate the amount of power being supplied to track 14 and selectively activate LEDs based on the amount of power being supplied to the track 14. For example, in an embodiment where the power system is designed to supply a maximum of 300 watts to track 14, a green LED may be used to indicate that less than 280 watts of power is being supplied to the track 14, an orange LED may be used to indicate that between 280-300 watts of power is being supplied to the track 14, and a red LED may be used to indicate that more than 300 watts of power is being supplied to the track 14. In some embodiments, if the runtime voltage, current, and temperature monitoring task 318 detects that more power than a high-power threshold (e.g. 335 watts) is being supplied to track 14, the system may enter into fault state and/or error state.

In some embodiments, the runtime voltage, current, and temperature monitoring task 318 is programmed to perform hot swap controller fault detection. In some embodiments, hot swap fault interrupts during PMM drive operation are used for detecting the faults in the power lane. The hot swap fault interrupt occurs only when the current consumption is more than the 10 Amps, or the Voltage is less than 32V or Voltage greater than 40V, or any short is detected on the track 14 during load conditions. This is a second level of protection by hardware to ensure safety. If an interrupt occurs, the software will stop PMM power drive operation, turn off the green LED, start blinking the red LED, and set the PMM task 314 state to a fault state.

In some embodiments, the runtime voltage, current, and temperature monitoring task 318 is programmed to perform temperature monitoring and temperature control. In some embodiments, temperature monitoring and temperature control includes detecting the over temperature during the ON time period of the drive pad pulse. Task 318 reads the temperature for 10 consecutive ON/OFF cycles, if the temperature is greater than the defined range than the software 300 immediately turns ON the fan to cool the internal temperature of the enclosure of the base unit. If the temperature does not reduce or continues to rise, the system may cease operation temporarily until the temperature has been reduced. If the temperature is less than the defined range, the software turns off the fan if the fan is the ON state.

In some embodiments, the application 300 includes a system error task 320. In some embodiments, the system error task 320 indicates that the PMM task 314 is in the error state. In this state the system error task will operate the red LEDs, provide an external watch dog timer rest pin toggling, perform a heart-beat LED task, and monitor the enclosure temperature and control turning on/off the fan. Once the system enters into the error state, the system will not enter into another state until the system is power cycled, by having the user manually turn power supplied to the base unit 12 OFF and ON again.

Figure 4:
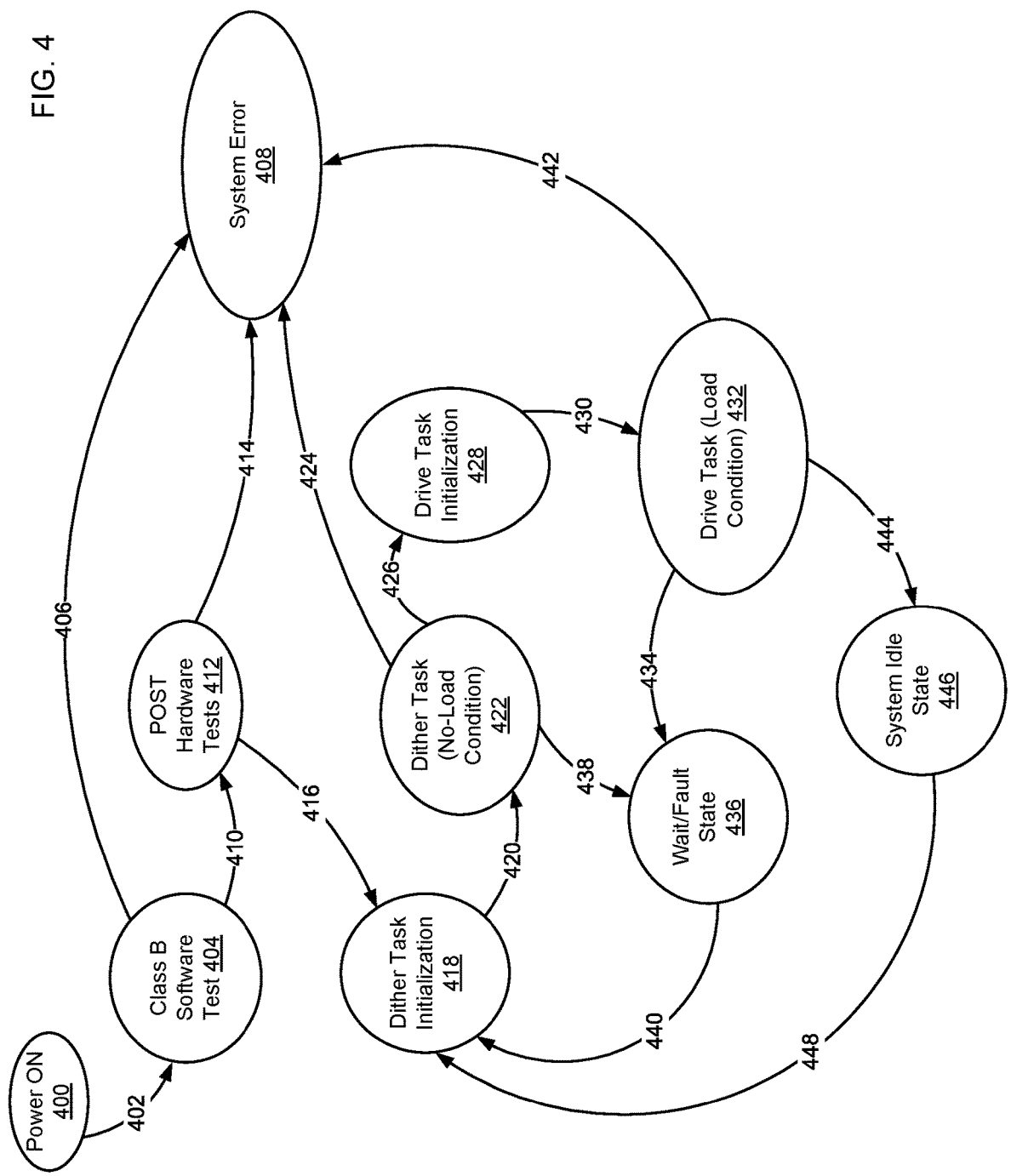
FIGS. 4-12 are state diagrams illustrating changes in state of the system depending on operational conditions of the power system, according to some embodiments.

FIG. 4 shows an example state machine implemented by software 300 according to some embodiments. As shown in FIG. 4, the state machine starts at an initial state 400 when power is turned on to the power system 10. State transfer occurs (arrow 402) to state 404, where Class B software tests are performed. Additional details about the Class B software tests are discussed herein in connection with FIG. 13. In some embodiments, the Class B software tests are performed before application initialization. If an error is detected in any of the Class B software tests, state transfer occurs (arrow 406), to a system error state 408.

If no errors are detected in the Class B software tests, state transfer occurs (arrow 410), to state 412 where POST power tests are performed. Additional details about the POST power tests are discussed herein in connection with FIG. 14. If an error is detected in board power tests, state transfer occurs (arrow 414), to system error state 408. Whenever the system enters system error state 408, the only way to exit error state 408 is to power cycle the system. When the system is turned OFF and then ON again, the system will re-start at state 400.

If no errors are detected in the board power tests, state transfer occurs (arrow 416), to state 418 where the dither task 306 is initialized. Once dither task 306 is initialized, state transfer occurs (arrow 420) to state 422 where dither task 306 executes under a no-load condition. If an error is detected by dither task 306 in state 422, state transfer occurs (arrow 424) to system error state 408. If an objected is detected on the track or a touch is detected by the dither task 306 in state 422, state transfer occurs (arrow 438) to wait/fault state 436.

If a puck 18 is detected on track 14 by dither task 306 in state 422, state transfer occurs (arrow 426) to state 428 in which the system will initialize the drive task of PMM task 314 to provide power to the track 14.

Once the drive task has been initialized, state transfer occurs (arrow 430), to state 432—drive task load condition—in which the drive task of the power management module task 314 operates to provide power to the track 14. During state 432, if any object is detected on the track 14 or at least one puck 18 is not found on the track 14, state transfer occurs (arrow 434) to state 436, wait/fault state. State transfer (arrow 438) may also occur to wait/fault state 436 from state 422 if an object is detected on the track by the dither task when the dither task is operating under no load conditions. Whenever state transfer to wait/fault state 436 occurs, the system will wait for a predetermined time period, such as 3-10 seconds, which will be referred to herein as a "wait period." After expiration of the wait period, state transfer occurs (arrow 440) to dither task initialization state 418. As noted above, different wait periods may be used by the fault state task 312 to determine the length of time the system will stay in the wait/fault state 436. In some embodiments, the length of time the system will stay in wait/fault state 436 depends on the previous state of the system.

As shown in FIG. 4, state 418, state 422, state 428, state 432, and state 436 form a loop. Thus, for example, if an object is on the track 14 which is causing a short between two or more of the exposed electrical contacts 15, the system will cycle through states 418, 422, 428, and 432 until the system reaches wait/fault state 436 where the system state will remain for the wait period. After iterating this process, a set number of contiguous cycles, for example ten cycles, rather than allowing the state of the system to transfer again to the wait/fault state 436, state transfer occurs (arrow 442) to system error state 408. Once in system error state 408, the system will need to undergo a power cycle event to enable the system to re-start at initial state 400.

In the embodiment shown in FIG. 4, when the system is in state 432, in which the drive task of the power management module task 314 provides power to the track 14, if a high temperature is detected in the base unit 12, state transfer occurs (arrow 444) to system idle state 446. In system idle state 446 power is not provided to the track 14 and a fan is turned on inside the enclosure of the base unit 12 to cool the base unit 12. Once the temperature has been sufficiently reduced, state transfer occurs (arrow 448) to state 418 for dither task initialization to enable the system to resume providing power to the track 14. Although state transfer (arrow 444) is shown as coming from state 432, state transfer to the system idle state 446 can occur from any other state in FIG. 4 after completion of the Class B software tests in state 404 and board power tests in state 412, with the exception of system error state 408. Thus, although not shown, state transfer to the system idle state 446 can occur from dither task initialization state 418, dither task no load condition state 422, drive task initialization state 428, or wait/fault state 436.

Figure 5:
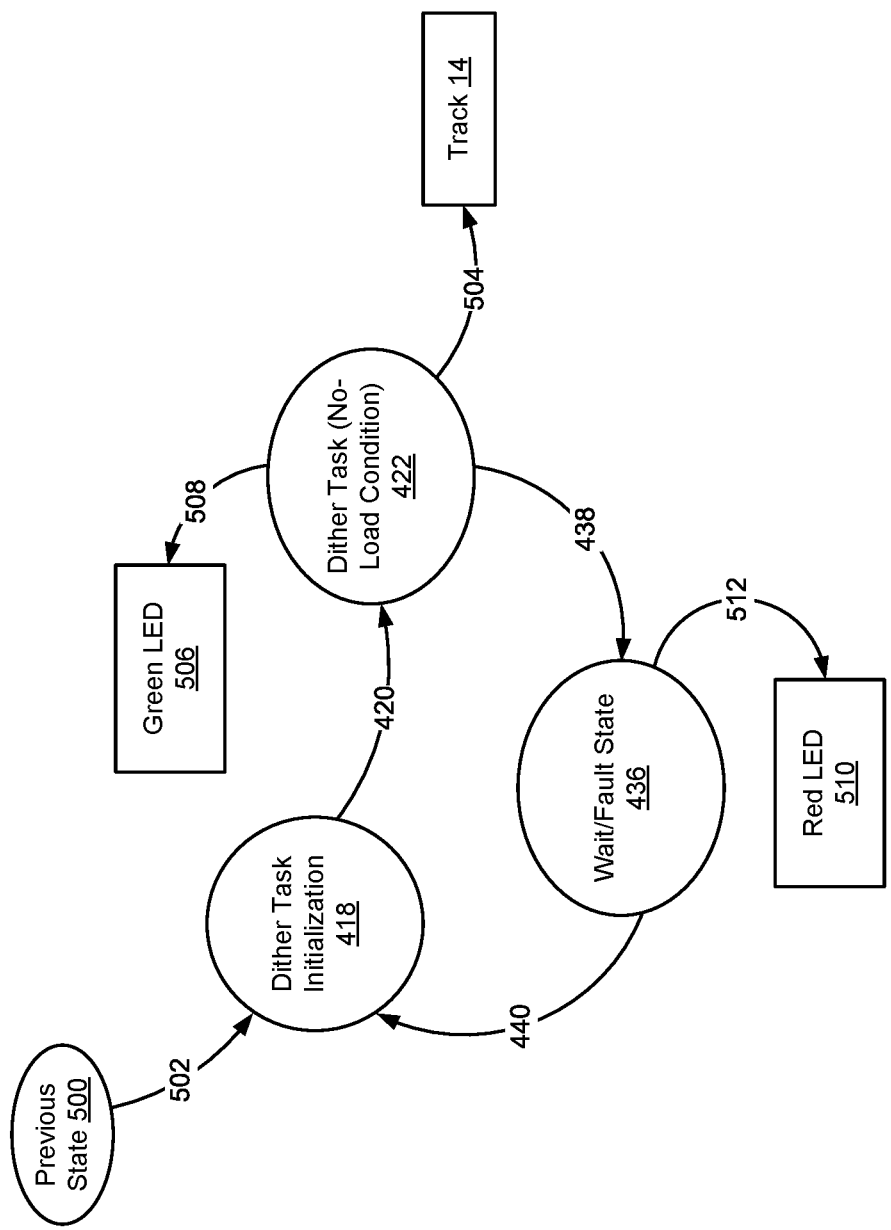

FIG. 5 is a state diagram showing additional details of a sub-loop in which the dither task 306 performs touch/object/fault detection under no load conditions. A no load condition occurs where no puck 18 is connected to track 14 and, hence, power is not being applied to the track 14.

As described above, there are several ways for the system to transition to dither task initialization state 418. For convenience, these various previous states are summarized in FIG. 5 as previous state 500. Example previous states 500 may include board power test state 412, wait/fault state 436, or system idle state 446.

When state transfer occurs (arrow 502) from the previous state 500 to state 418, dither task 306 is initialized. Once dither task 306 is initialized, state transfer occurs (arrow 420) to state 422 where dither task 306 executes under a no-load condition. While dither task 306 is operational, the system will drive a low (minimum) voltage on/off on track 14 (arrow 504), check for the presence of a puck 18, and check for faults such as a short on the track, a person touching the track, or an object placed on the track. While the dither task is operating under no load conditions, a green LED 506 on the base unit 12 is enabled (arrow 508). For example, the green LED 506 may be caused to blink.

In some embodiments, the system will respond within in 275 ms if a touch, an object, or a short is detected on the track 14. If a touch/short/object is detected on the track, state transfer occurs (arrow 438) to wait/fault state 436. When the system is in the wait/fault state 436, the dither task stops applying voltage 504 to track 14 and the system will remain in the wait/fault state 436 for the wait period. In some embodiments, the wait period is three seconds. In some embodiments, while the system is in wait/fault state 436, a red LED 510 on the base unit 12 is enabled (arrow 512). For example, the red LED may be caused to blink. When the wait period expires, state transfer occurs (arrow 440) back to state 418. Fault detection during dither task 306 no-load condition helps to prevent the system from transitioning to power management module task 314 drive state 432 when a person is touching the track, or there is a short on the track for example due to the presence of metal or liquid on the track.

Figure 6:
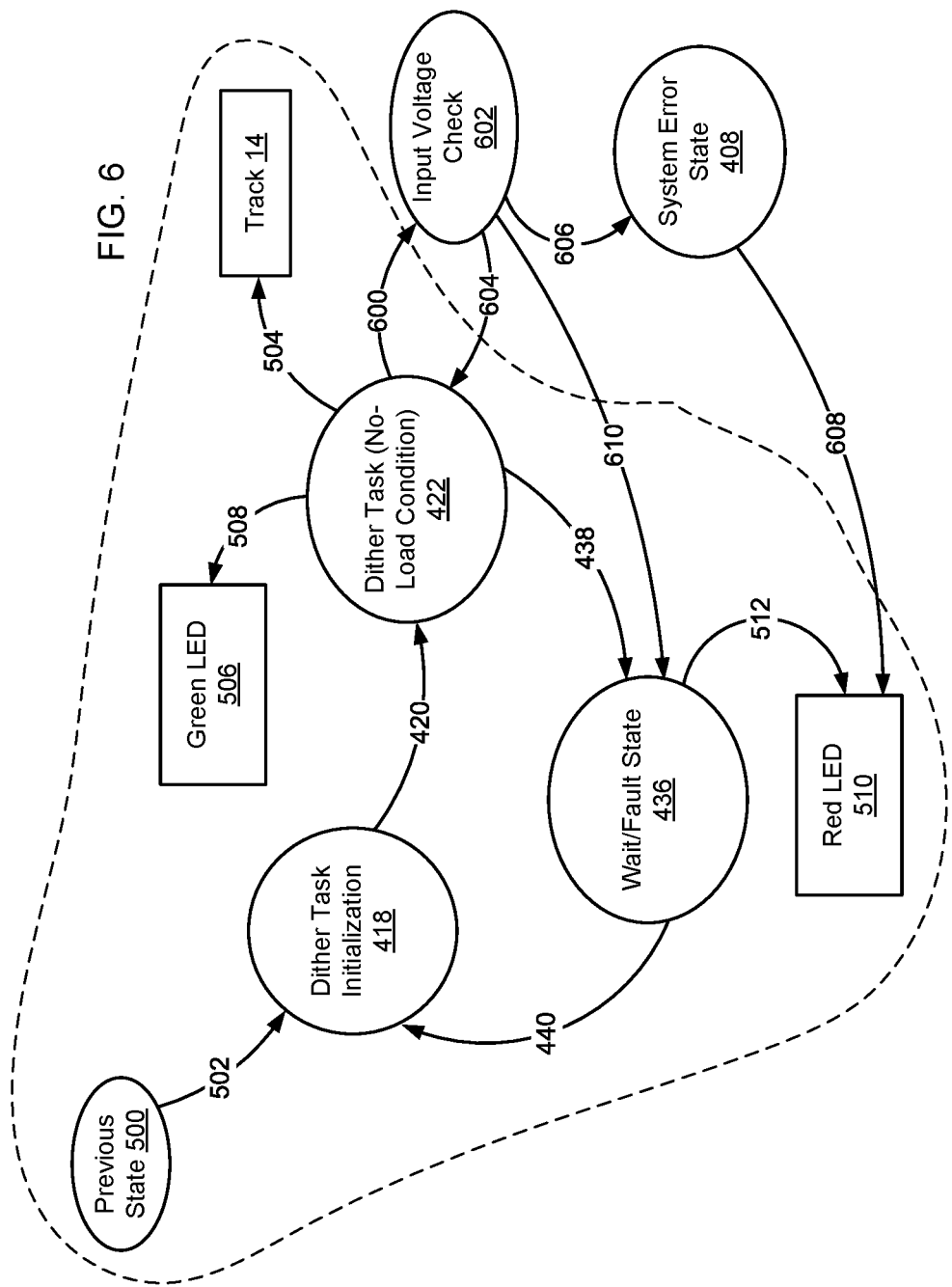

FIG. 6 is a state diagram showing input voltage error fault detection during no load conditions. The portion of FIG. 6 encircled by dashed lines is the same as FIG. 5 and, hence, a description of that portion will not be repeated for brevity. As shown in FIG. 6, while the system is executing the sub-loop shown in FIG. 5, the dither task 306 will check for errors in the input voltage. To check for errors in the input voltage, in some embodiments a system state transfer occurs (arrow 600) to state 602 in which an input voltage check is performed. In some embodiments, the input voltage check is performed by the runtime voltage, current, and temperature monitoring task 318. If input voltage levels are acceptable, a state transfer occurs (arrow 604) to return to system state 422 (dither task no load condition).

In some embodiments, the input voltage check occurs every 11 ms. By checking often for errors in the input voltage, the system is able to respond within in 11 ms if low voltage or high input dc voltage detected on the base unit 12. During this operation, when the system changes to state 602, the minimum output voltage on track 14 from dither task 306 is shut off.

If there is an input voltage anomaly detected in state 602, a state transfer occurs (arrow 604) to state 422, and because of the error a second state transfer occurs (arrow 438) to wait/fault state 436. Alternatively, state transfer may occur (arrow 610) directly from input voltage check state 602 to wait/fault state 436. After the expiration of a wait period, e.g. a wait period of six seconds, the system will go back to normal operation (state transfer arrow 440) to execute the sub-loop of FIG. 5. Each time the sub-loop enters state 422, an input voltage check (transition 600, state 602, and transition 604) will be implemented. If the input voltage error occurs five consecutive times, a state transfer occurs (arrow 606) to system error state 408. The system will remain in the system error state until a power reset operation occurs. While in the system error state, the red LED 510 is enabled (arrow 608). For example, the red LED may be caused to continuously blink every 2 seconds. Pausing the dither task 306 to switch system state to perform input voltage checks (state 602) helps to avoid operation of the base unit 12 under low or high input voltage conditions.

Figure 7:
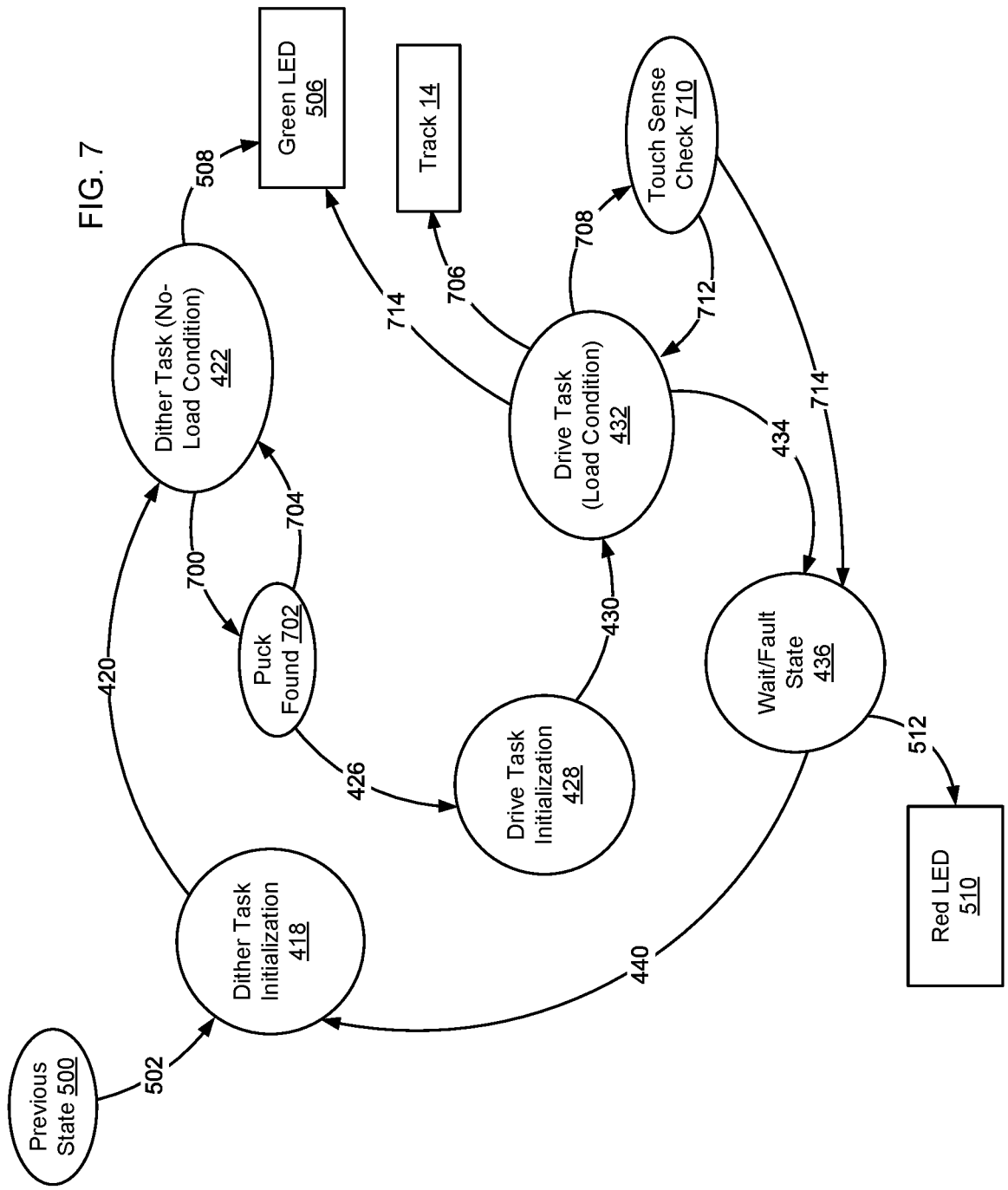

FIG. 7 is a state diagram showing touch fault detection during the load condition, when a puck 18 is detected on track 14 and power is being applied to the track 14. Many of the system states and state transfers have previously been described, for example in connection with FIGS. 4 and 5. For brevity, these states and state transfers are not repeated in connection with FIG. 7. Rather, only the new aspects shown in FIG. 7 will be separately described in connection therewith.

As shown in FIG. 7, when the system is in state 422 and the dither task is operating under no load condition, periodically a state transfer occurs (arrow 700) to puck detection state 702. For example, in some embodiments, puck detection may occur every 550 ms. If no puck is found, state transfer occurs (arrow 704) to return to state 422. If a puck is detected, state transfer occurs (arrow 426) to enter drive task initialization state 428 and then (arrow 430) to drive task load condition 432. As noted above, in state 432 the drive task of the power management module task 314 operates to provide power (arrow 706) to the track 14. In some embodiments, the green LED 506 is turned on (arrow 714) when the drive task is providing power to track 14.

While the system is in state 432, periodically a system state transfer occurs (arrow 708) to state 710 in which a touch sense check is performed on the track 14. In some embodiments, state transfer (arrow 706) occurs every 12.5 ms. By checking frequently whether a person is touching the track, the system is able to respond to stop applying power to the track 14 when a person comes into contact with the track. If the touch sense check does not detect that a person is touching the track 14, a state transfer occurs (arrow 712) to return to state 432. While the system is in state 710, application of power to the track (arrow 706) is temporarily suspended by PMM task 314.

If a touch is detected in state 710, a state transfer occurs (arrow 712) to state 432, and because of the error a second state transfer occurs (arrow 434) to wait/fault state. Alternatively, state transfer may occur (arrow 714) directly from touch sense check state 710 to wait/fault state 436. After the expiration of a wait period, e.g. a wait period of three seconds, the system will go back to normal operation (arrow 440) and return to dither task initialization state 418.

Each time the system enters state 432, periodic touch sense checks (transition 708, state 712, and transition 714) will be implemented. By frequently checking as to whether a person is touching the track, it is possible to prevent outputting power on track 14 when a person touches the track which provides safety for use of the track in an environment where the track may come into contact with people. Since touch events tend to be of relatively short duration, in some embodiments the system does not enter system error state 408 after a set number of consecutive cycles through wait/fault state 436. However, optionally in some embodiments the system may enter into system error state 408 after a touch is detected in five consecutive cycles through wait/fault state 436.

Figure 8:
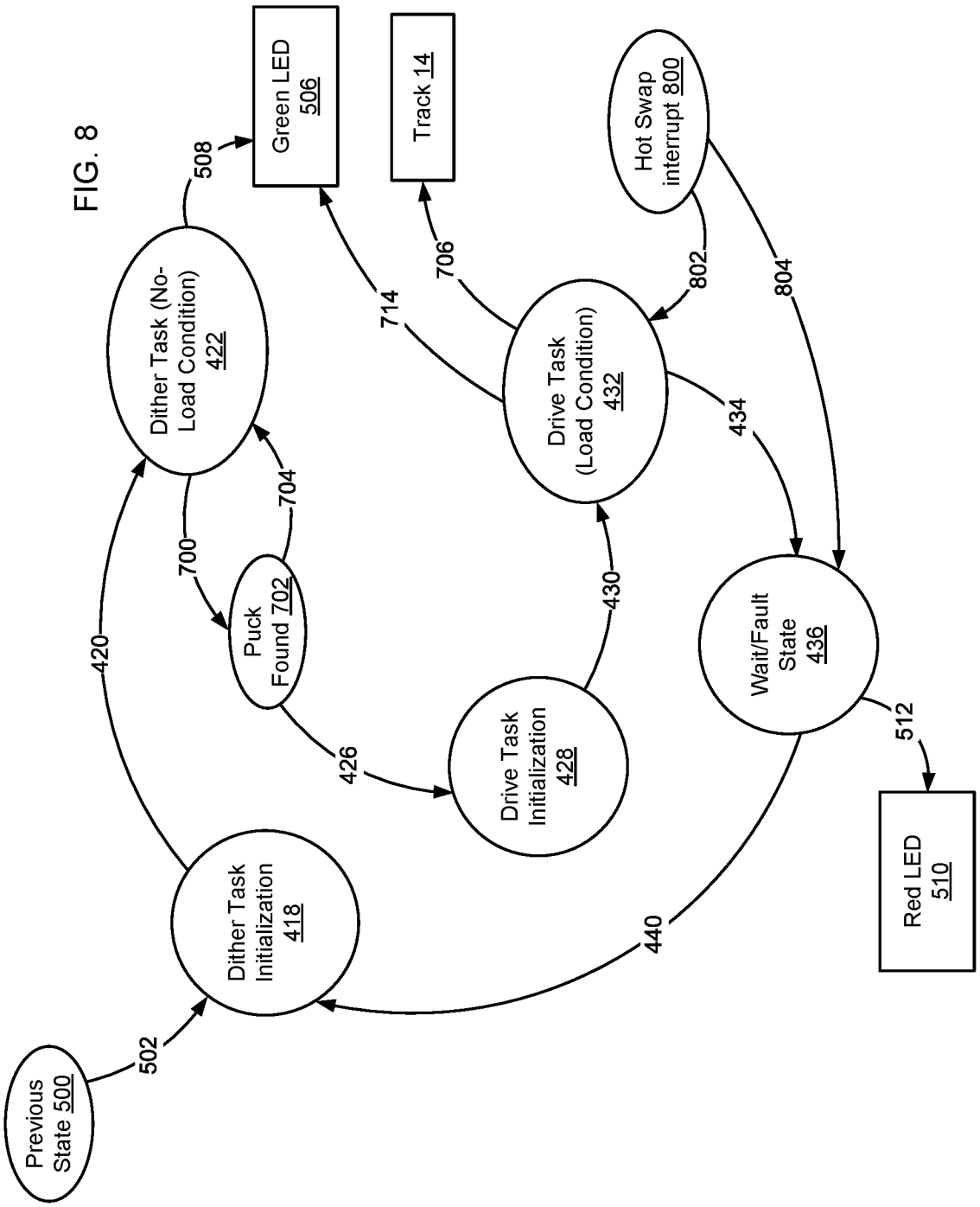

FIG. 8 is a state diagram showing short/object detection during load condition. FIG. 8 is similar to FIG. 7, except that in FIG. 8 the swap controller 212 in hardware will periodically interrupt the controller to perform short or object detection. Interruption of the controller by hot swap controller causes the system to enter state 800, in which power to the track 14 is temporarily turned off and object/short detection will be performed on track 14. When the object/short detection process has completed, state transfer (arrow 802) occurs to return controller to drive task load condition state 432. If an object/short was not found, drive task load condition state 432 applies power to track 14 (arrow 706). If an object/short was found, a state transfer (arrow 434) immediately occurs to place the system in wait/fault state 436. Alternatively, state transfer may occur (arrow 804) directly from hot swap interrupt state 800 to wait/fault state 436. Object/short detection helps to stop normal operation if metal, liquid, or other items are causing a short circuit on the track 14. Optionally in some embodiments the system may enter into system error state 408 after an object/short has been detected in five consecutive cycles through wait/fault state 436.

Figure 9:
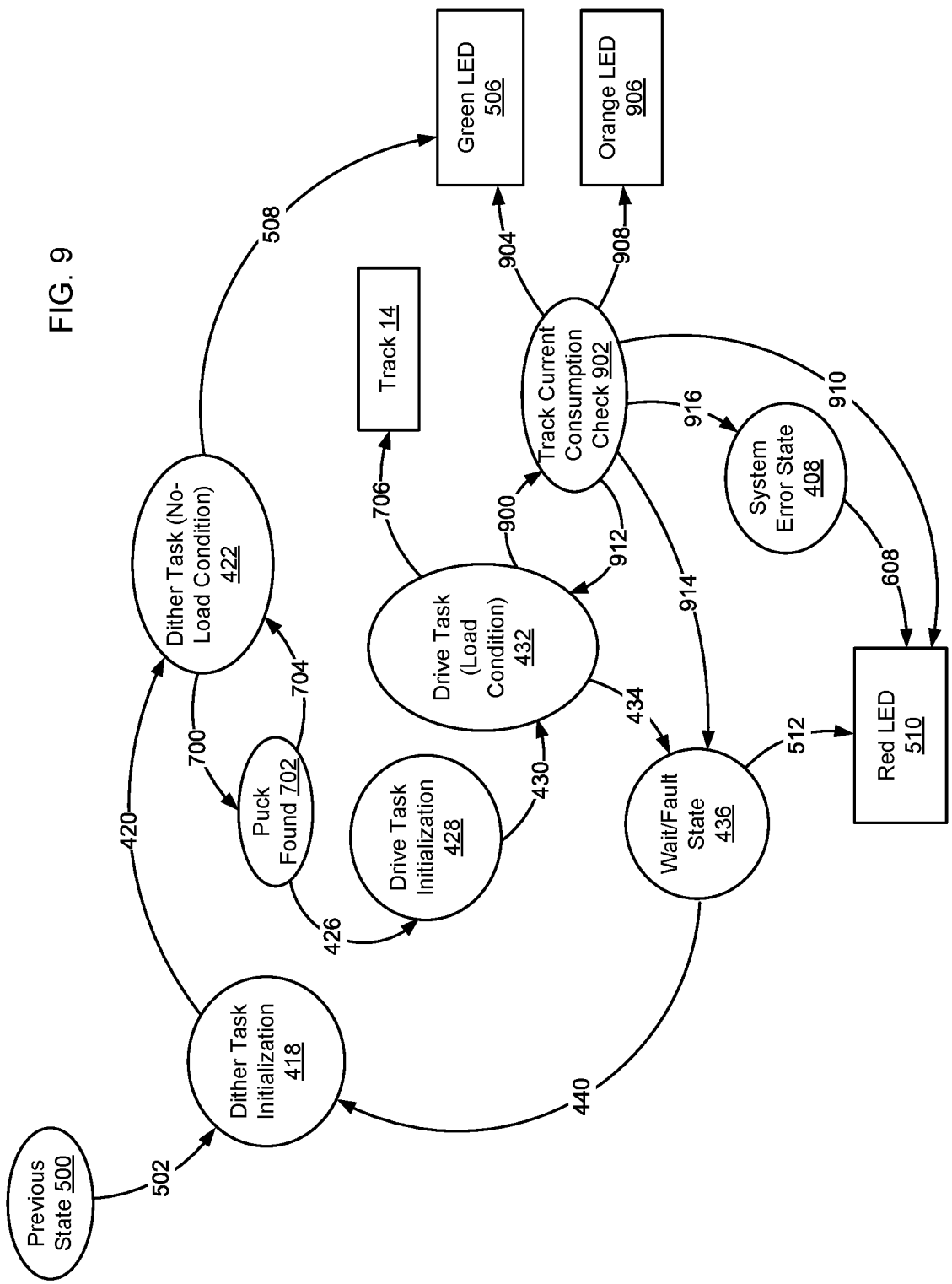

FIG. 9 is a state diagram showing over current fault detection while the system is in drive task load condition state 432. As shown in FIG. 9, periodically (e.g. every 500 ms) while the system is in drive task load condition state 432, a state transfer occurs (arrow 900) to state 902 during which a current check is implemented by determining how much current is being drawn on the track 14. The amount of current directly translates to the amount of power being supplied by the track to attached connectors 18.

In some embodiments the system is designed to provide a maximum of 300 watts of power. In other embodiments, the system may be designed to provide other power levels. In some embodiments different color LEDs are used to visually indicate the amount of power being drawn by the track. For example, in some embodiments, if the track is providing less than a first threshold power level, the green LED 506 is turned on (arrow 904). Thus, for example, if the system is designed to provide a maximum of 300 watts of power, the first threshold may be set to be 280 watts such that the green LED will be turned on (arrow 904) when the attached connectors are drawing less than 280 watts of power. If the system is providing more than the first threshold power level and less than the maximum power level, a different color LED such as an orange LED 906 is turned on (arrow 908). If the amount of power being drawn exceeds the designed maximum amount of power, a third color LED such as a red LED 510 is turned on (arrow 910).

After the current check, state transfer occurs (arrow 912) to drive task load condition state 432 if the amount of current being drawn is less than the system's designed maximum operating power level. If the amount of current being drawn by the track 14 exceeds the system's designed maximum operating power level, the system state transitions (arrow 914) to wait/fault state 436. Although FIG. 9 shows the state transfer to wait/fault state 436 directly from track current consumption check state 902, in some embodiments state transfer may occur instead from state 902 to state 432 (arrow 912), and then immediately from state 432 to wait/fault state 436 (arrow 434).

If the detected output current exceeds the system's designed maximum operating power level, power to the track 14 is turned off and the system will remain in the wait/fault state 436 for a wait period. In some embodiments the system remains in wait/fault state 436 for a 10 second wait period before transitioning (arrow 440) to state 418 to resume operation. If the detected output current exceeds the system's designed maximum operating power level in five consecutive iterations of the drive task control loop, when the over-current condition is detected in the fifth consecutive cycle instead of transitioning to wait/fault state, a system state transfer occurs (arrow 916) to system error state 408. The system will remain in system until a power cycle operation occurs to return the system to state 400. While in system error state 408, red LED 510 will be turned on (arrow 608).

If the detected output current exceeds a high-power threshold (e.g. 335 watts) is being supplied to track 14, in some embodiments the system transitions (arrow 916) directly to system error state 408 without cycling through wait/fault state 436 five consecutive times to protect the electronics of the system.

Figure 10:
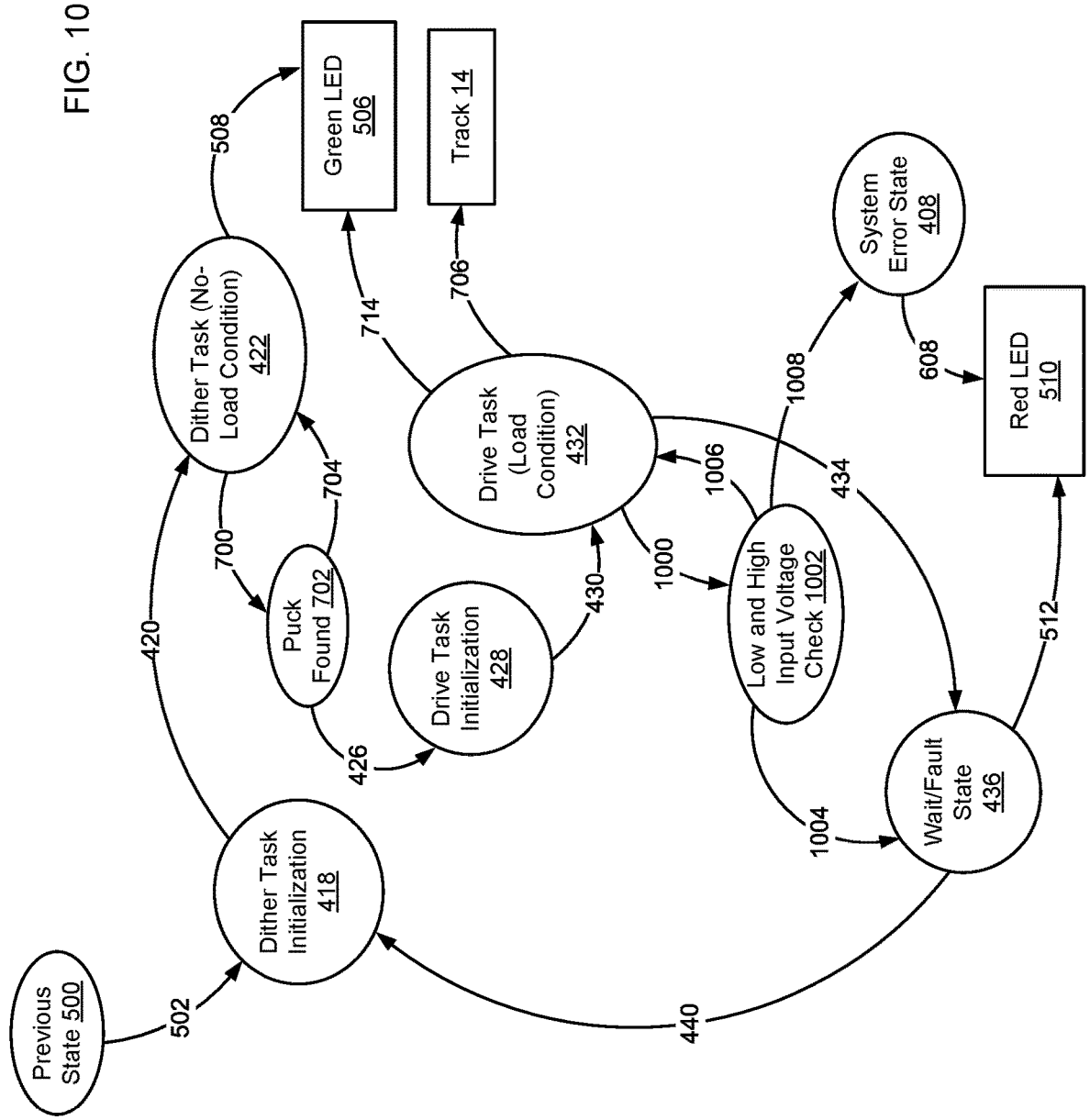

FIG. 10 is a state diagram showing low and high input voltage fault detection during load conditions, when the system is in drive task load condition state 432. As shown in FIG. 10, periodically (e.g. every 25 ms) while the system is in drive task load condition state 432, a state transfer occurs (arrow 1000) to state 1002 during which high and low input voltages are checked. If the high and low input voltage checks determine that the input voltages are within acceptable levels, state transfer occurs (arrow 1006) to return the system to state 432.

If a high or low input voltage is determined in state 1002, state transfer occurs (arrow 1004) to wait/fault state 436 for a wait period (e.g. 6 seconds), during which time power to the track is turned off. Although FIG. 10 shows state transfer (arrow 1004) occurring directly from state 1002 to wait/fault state 436, in some embodiments state transfer (arrow 1006) may occur instead, and then an immediate second state transfer (arrow 434) to wait/fault state may occur. In either instance, the system will remain in wait/fault state for the wait period and then resume operation (arrow 440).

If a high or low input voltage is determined for five consecutive cycles, state transfer occurs (arrow 1008) to system error state 408. The system will remain in system error state 408 until a power reset occurs. While in system error state 408, red LED 510 is turned on (arrow 608). Detecting high and low input voltages helps prevent the power system from operating where the input voltage conditions are unsuitable.

Figure 11:
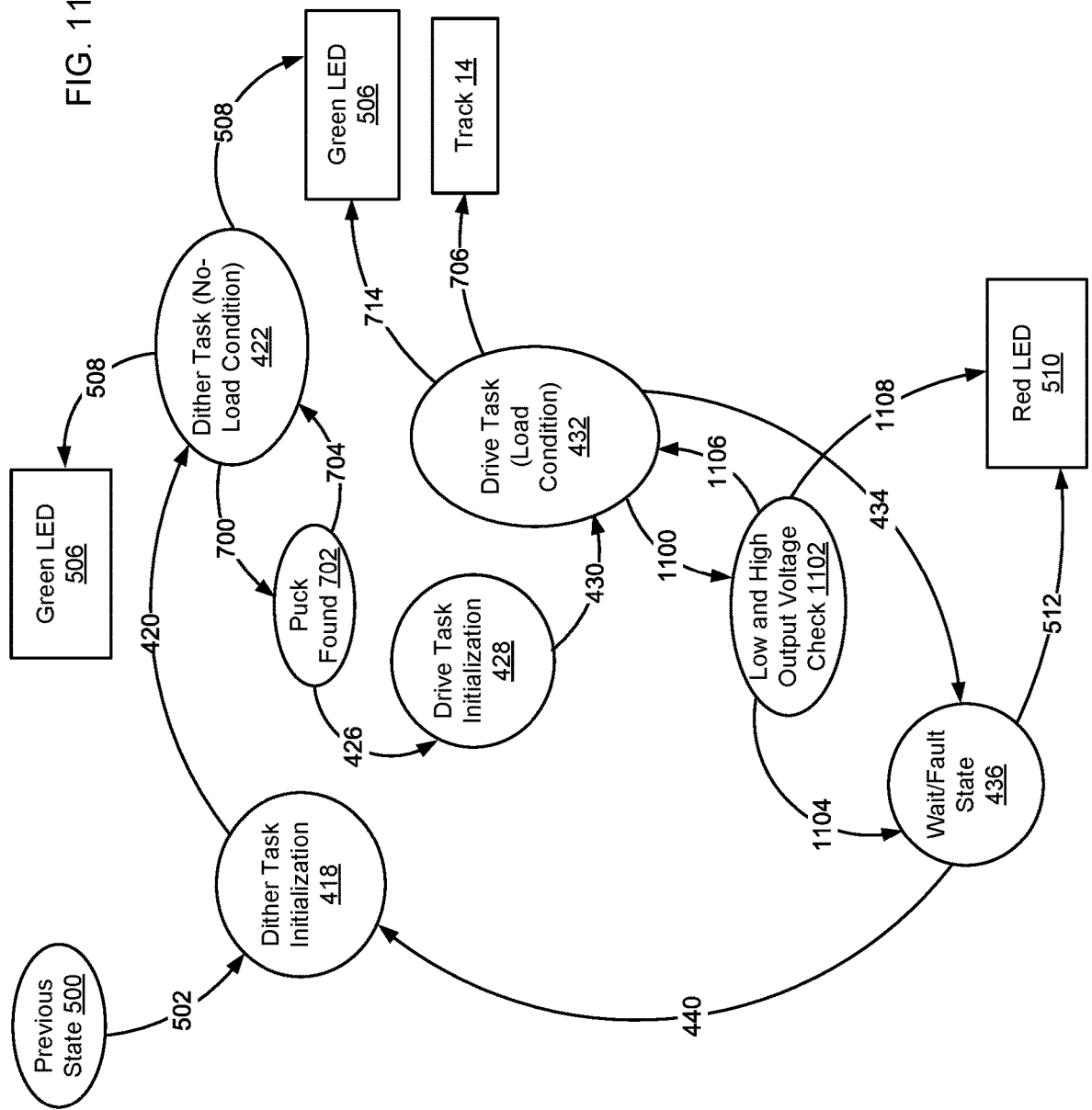

FIG. 11 is a state diagram showing low and high output voltage fault detection during load conditions, when the system is in drive task load condition state 432. FIG. 11 is similar to FIG. 10, except that in FIG. 11 the voltage checks that are performed are performed on output voltage on track 14 rather than the input voltage to base unit 12.

As shown in FIG. 11, periodically (e.g. every 25 ms) while the system is in drive task load condition state 432, a state transfer occurs (arrow 1100) to state 1102 during which high and low output voltages are checked to determine if the voltage level on the track 14 is above a high threshold value or if the voltage level on the track is below a low threshold value. In some embodiments the high threshold value is 38 volts and the low threshold value is 34.5 volts. If the high and low output voltage checks determine that the output voltage on the track is within an acceptable range, state transfer occurs (arrow 1106) to return the system to drive task load condition state 432.

If a high or low output voltage is detected in state 1102, state transfer occurs (arrow 1104) to wait/fault state 436 for a wait period (e.g. 6 seconds), during which time power to the track is turned off. Although FIG. 11 shows state transfer (arrow 1104) occurring directly from state 1102 to wait/fault state 436, in some embodiments state transfer (arrow 1106) may occur instead, and then an immediate second state transfer (arrow 434) to wait/fault state may occur. In either instance, the system will remain in wait/fault state for the wait period and then resume operation (arrow 440).

If a high or low input voltage is determined for five consecutive cycles, state transfer occurs (arrow 1108) to system error state 408. The system will remain in system error state 408 until a power reset occurs. While in system error state 408, red LED 510 is turned on (arrow 608). Detecting high and low output voltages helps prevent the power system from providing power to the track outside of acceptable voltage levels.

Figure 12:
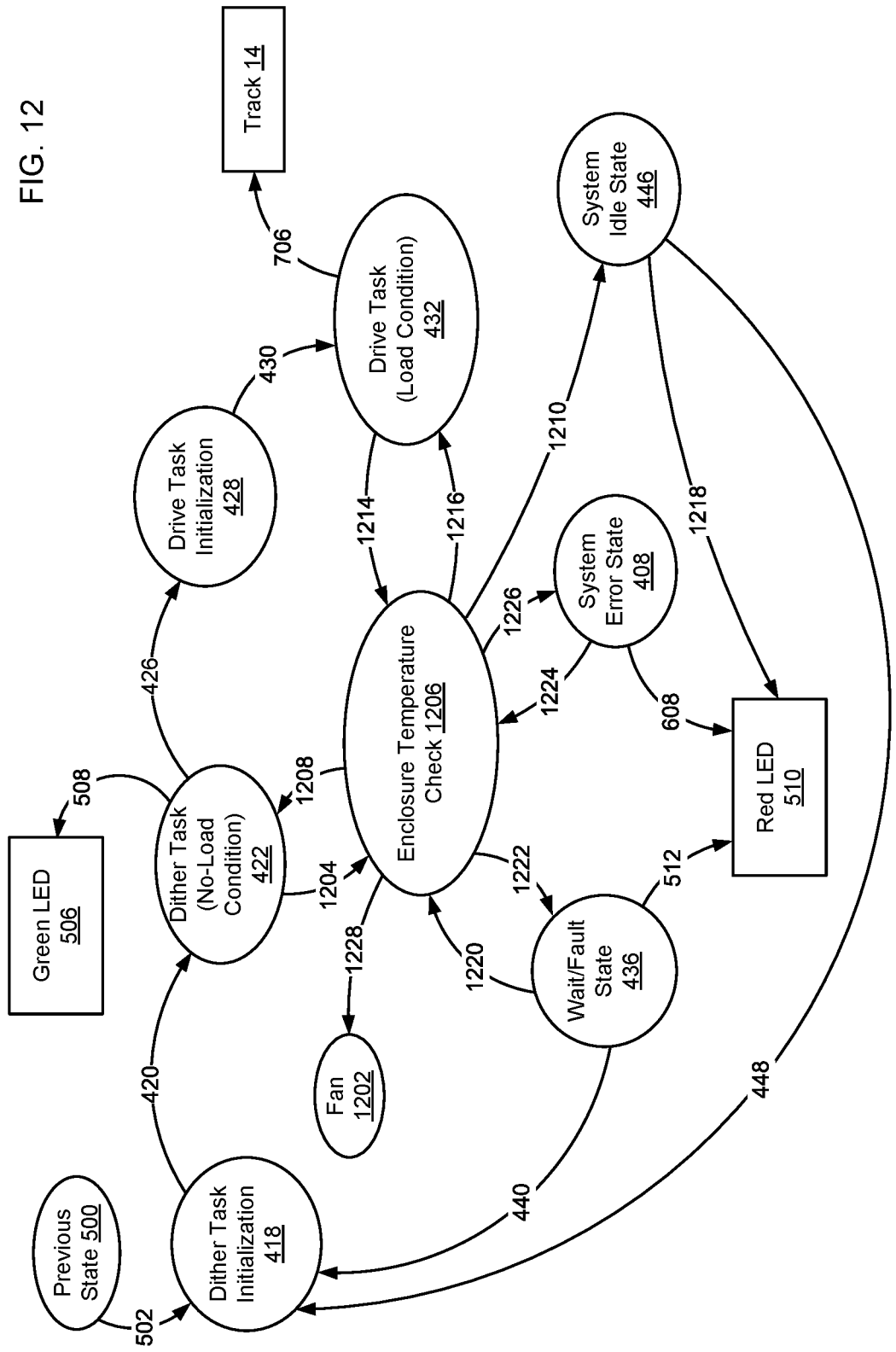

FIG. 12 is a state diagram showing the manner in which the temperature of the enclosure of the base unit 12 is monitored. As shown in FIG. 12, temperature monitoring occurs periodically while the system is connected to power regardless of the state of the system. For example, in some embodiments the system performs a temperature check each 1 second and, if a high temperature is detected in the enclosure, remedial actions are taken. Example remedial actions may include placing the system in system idle state 446 to stop application of power to track 14 and activating fan 1202. For example, if the detected temperature is above 50° C., the fan 1202 may be turned on. If the detected temperature is above 55° C., the system will shut off the output voltage and enter into system idle state to cool the enclosure. In some embodiments, once the system enters system idle state 446 the system will remain in system idle state 446 until the temperature has been reduced below a turn-on threshold such as 35° C. Other temperature thresholds may be used in other embodiments. Monitoring the temperature enables the power unit to avoid operating at unsafe temperature levels.

For example, when the system is in dither task no load condition state 422, system state transfer occurs (arrow 1204) to state 1206 where a temperature check is performed. If the temperature is within an operating range, state transfer 1208 occurs to return the system to state 422. If the temperature is not within the operating range, for example if the detected temperature above a turn-off threshold such as 55° C., a state transfer occurs (arrow 1210) to idle state 446.

During idle state, dither power is not applied to the track 14 and fan 1202 is activated. Red LED 510 is also turned on (arrow 1218). The system will stay in idle state until the temperature drops below a turn-on threshold. For example, in some embodiments the system will stay in idle state 446 until the temperature is at or below 35° C. Once the temperature is below the turn-on threshold, state transfer occurs (arrow 448) to dither task initialization state 418.

Similar state transfers occur when the system is in drive task load condition state 432. Specifically, while the system is in drive task load condition state 432, the drive task will be interrupted periodically to enable the temperature of the enclosure to be checked. As shown in FIG. 12, when the system is in drive task load condition state 432, state transfer occurs (arrow 1214) to enclosure temperature check state 1206. If the temperature is within the intended operating temperature range, state transfer occurs (arrow 1216) to return to drive task load condition state 432. If the temperature is above the turn-off threshold, state transfer occurs (arrow 1210) to idle state 446. While in idle state 446, power is not supplied to track 14, fan 1202 is turned on, and the red LED 510 is turned on (arrow 1218).

Since system temperature is important to monitor, similar monitoring also happens from wait/fault state 436 and from system error state 408. Specifically, if the system is in wait/fault state 436, state transfer occurs (arrow 1220) to state 1206 to enable the enclosure temperature to be checked. If the temperature is too high, fan 1202 is turned on and the system state transfers to idle state 446. If the temperature is acceptable, state transfer occurs (arrow 1222) to return the system to wait/fault state 436. If the fan is on, and the temperature is below a threshold, optionally the fan may be turned off.

If the system is in system error state 408, it is still important to monitor the temperature of the enclosure. Accordingly, periodically system state transfer occurs (arrow 1224) to state 1206 to enable the enclosure temperature to be checked. If the temperature is too high, the fan 1202 is turned on (arrow 1228). Power is not supplied to track 14 while the system is in the system error state 408 and, hence, no additional adjustments need to be made regarding system operation. Regardless of whether the temperature is acceptable or too high, after performing the temperature check in state 1206, state transfer occurs 1226 to return the system to system error state 408. Notably, if the system previously was in system error state 408, determination of a high temperature in state 1206 does not cause the system to enter idle state 446 since doing so could possibly allow the system to exit system error state without performing a system power cycle.

Figure 13:
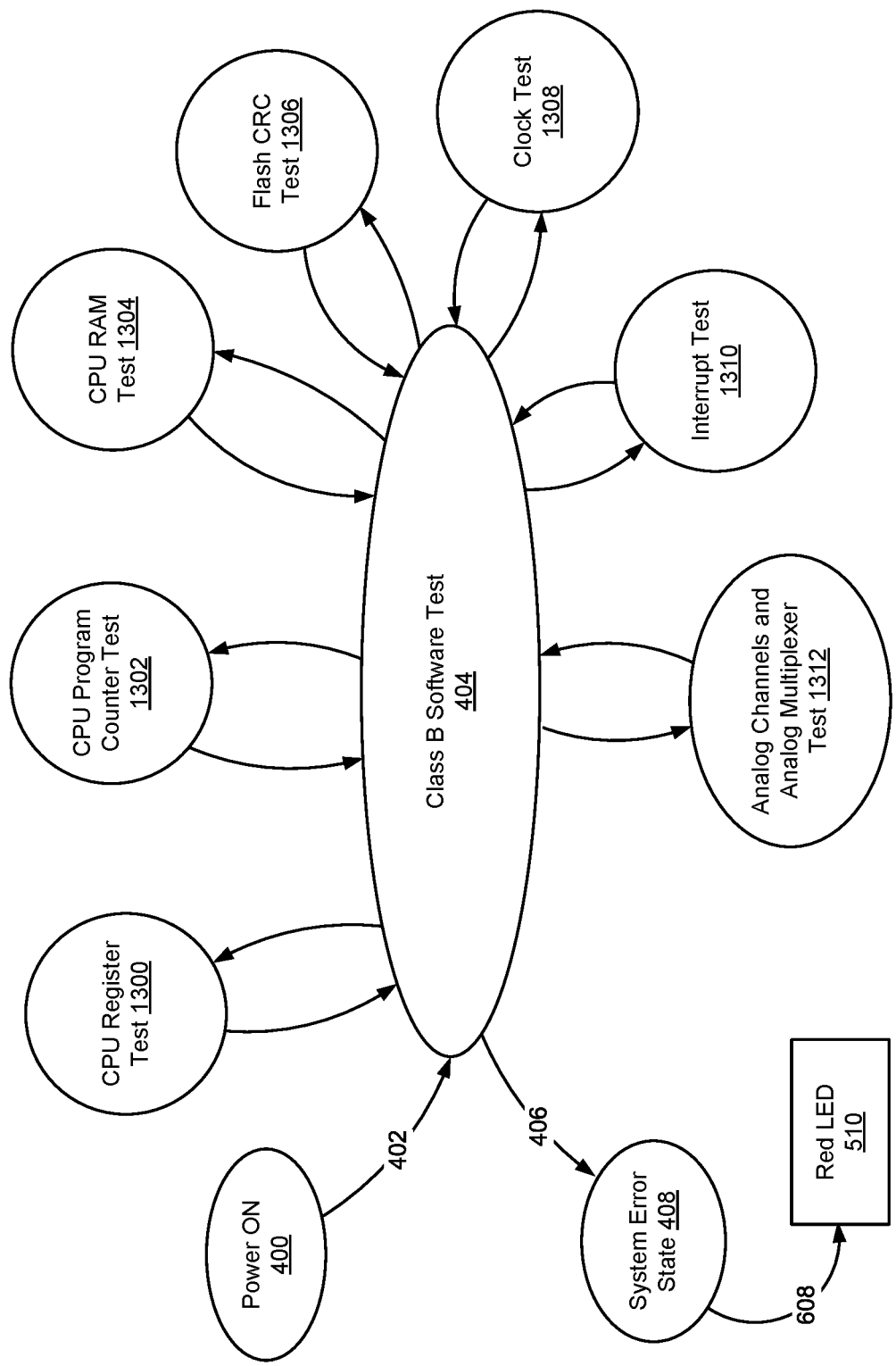
FIG. 13 is a functional block diagram illustrating Class B software tests performed by the power controller according to some embodiments.

FIG. 13 is a functional block diagram showing the Class B software tests performed by Class B safety software test task 302 in state 404. In some embodiments, the system software uses the microchip Class B safety software routines for testing the microcontroller performance. In some embodiments, when the system is powered ON (state 400) state transfer occurs (arrow 402) to state 404 where single-channel with functional tests are performed. In some embodiments, the Class B safety software tests include CPU register tests 1300; CPU program counter tests 1302; CPU RAM tests 1304; flash CRC tests 1306; clock tests 1308; interrupt test s1310; and analog channels and analog multiplexer tests 1312. If any Class B software test fails, system state transfer occurs (arrow 406) to system error state 408 and the red LED will be turned on.

In some embodiments, the Class B safety software library routines detect the occurrence of faults in a single channel CPU. In some embodiments these routines are developed in accordance with the IEC 60730 standard to support the Class B certification process. These routines are integrated with the application 300 to test and verify the critical functionalities of a controller without affecting the application 300. In some embodiments, the Application Programming Interface (API) functions are available in the Class B safety software library. In application 300, the Class B safety software library implements the important test and diagnostic methods that fall into the Class B category. These methods use various measures to detect and respond to the software related faults and errors. If any one of the Class B test fails, the system state transfers (arrow 406) to system error state 408. The system will remain in system error state 408 until the unit is power cycled.

The CPU register test 1300 implements the functional test H.2.16.5 defined by the IEC 60730 standard. It detects stuck-at faults in the CPU registers. This ensures that the bits in the registers are not stuck at a value '0' or '1'; this is a non-destructive test. In some embodiments, CPU register test 1300 saves the content of the CPU registers to be tested, successively writes binary sequences (length is dependent upon architecture), 010101 . . . followed by 101010 . . . into the registers, and then reading the values from these registers for verification. The test returns an error code if the returned values do not match the sequence that was written to the register.

The CPU Program Counter (PC) test 1302 implements the functional test H.2.16.5 defined by the IEC 60730 standard. The program counter holds the address of the next instruction to be executed. In some embodiments, the CPU Program Counter (PC) test 1302 operates by invoking the functions that are located in the flash memory at different addresses. These functions return a unique value. The returned value is verified using the PC test function. If the values match, the PC branches to the correct location.

The CPU RAM test 1304 implements the periodic static memory test H.2.19.6 defined by the IEC 60730 standard. It detects single bit faults in variable memory. Random Access Memory (RAM) contains data that is intended to vary during program execution. The RAM test is used to determine if any bit of the RAM is stuck at '1' or '0'. In some embodiments a march memory test and/or a checkerboard test are used to check for memory faults. March memory tests perform a finite set of operations on every memory cell in a memory array, such as by writing data to the memory cells and reading memory from the memory cells to look for discrepancies. A checkerboard RAM test writes a checkerboard pattern to a chunk of memory and reads the memory to look for discrepancies. Since these tests are well known, additional description of the possible implementations has been omitted.

The flash CRC test 1306 implements the periodic modified checksum test H.2.19.3.1 defined by the IEC 60730 standard. It detects the single bit faults in the invariable memory. The invariable memory in a system, such as flash and EEPROM memory, contains data that is not intended to vary during the program execution. In some embodiments, the flash CRC test 1304 determines whether the data contained in the invariable memory has changed by computing checksum using a Cyclic Redundancy Check (CRC) function and comparing the calculated CRC value with a previously CRC value calculated using the same CRC function. In some embodiments, the CRC divisor may have a selected value of between 8-32 bits.

The clock test 1308 implements the independent time slot monitoring test H.2.18.10.4 defined by the IEC 60730 standard. It verifies the reliability of the system clock (i.e., the system clock should be neither too fast nor too slow). In some embodiments, harmonics and subharmonics of the clock are tested as well. In some embodiments, the clock test is performed using a secondary oscillator.

The Interrupt test 1310 implements the independent time slot monitoring test H.2.18.10.4 defined by the IEC 60730 Standard. The interrupt test 1310 checks whether the number of interrupts that occurred is within the defined range. The goal of the Interrupt test is to verify that interrupts occur regularly. The Interrupt test function can be invoked at specified time intervals. It is triggered by a timer or line frequency interrupt to monitor and verify the interrupt operation. To keep track of the interrupts that occur frequently, a dedicated counter in each ISR can be decremented when an interrupt occurs. For example, if the Serial Peripheral Interface (SPI) is configured to generate an interrupt every 2 ms, the SPI will generate at least five interrupts in 10 ms. When a SPI interrupt occurs, the counter dedicated to keep track of the SPI interrupt is decremented. Thus, if the counter is initialized to five, the counter is decremented to zero in 10 ms. This is verified by the Interrupt test function that is triggered after every 10 ms to keep track of interrupts that occur rarely, a dedicated counter within the Interrupt test function is decremented if the specific interrupt did not occur during the last time interval.

Analog channels and analog multiplexer test 1312, in some embodiments, tests the analog functions of the A/D converter by applying a known external voltage to the analog inputs and comparing the conversion results with the applied voltage level. Similarly, the General-Purpose Input Output (GPIO) can be tested by determining whether an IO input value is the same as the expected value and whether an IO output value is the same as an expected output value. The analog multiplexer test may be implemented by applying a known external voltage to the analog inputs and comparing the results with expected results.

Although a specific set of tests were described, other tests may also be performed depending on the implementation.

Figure 14:
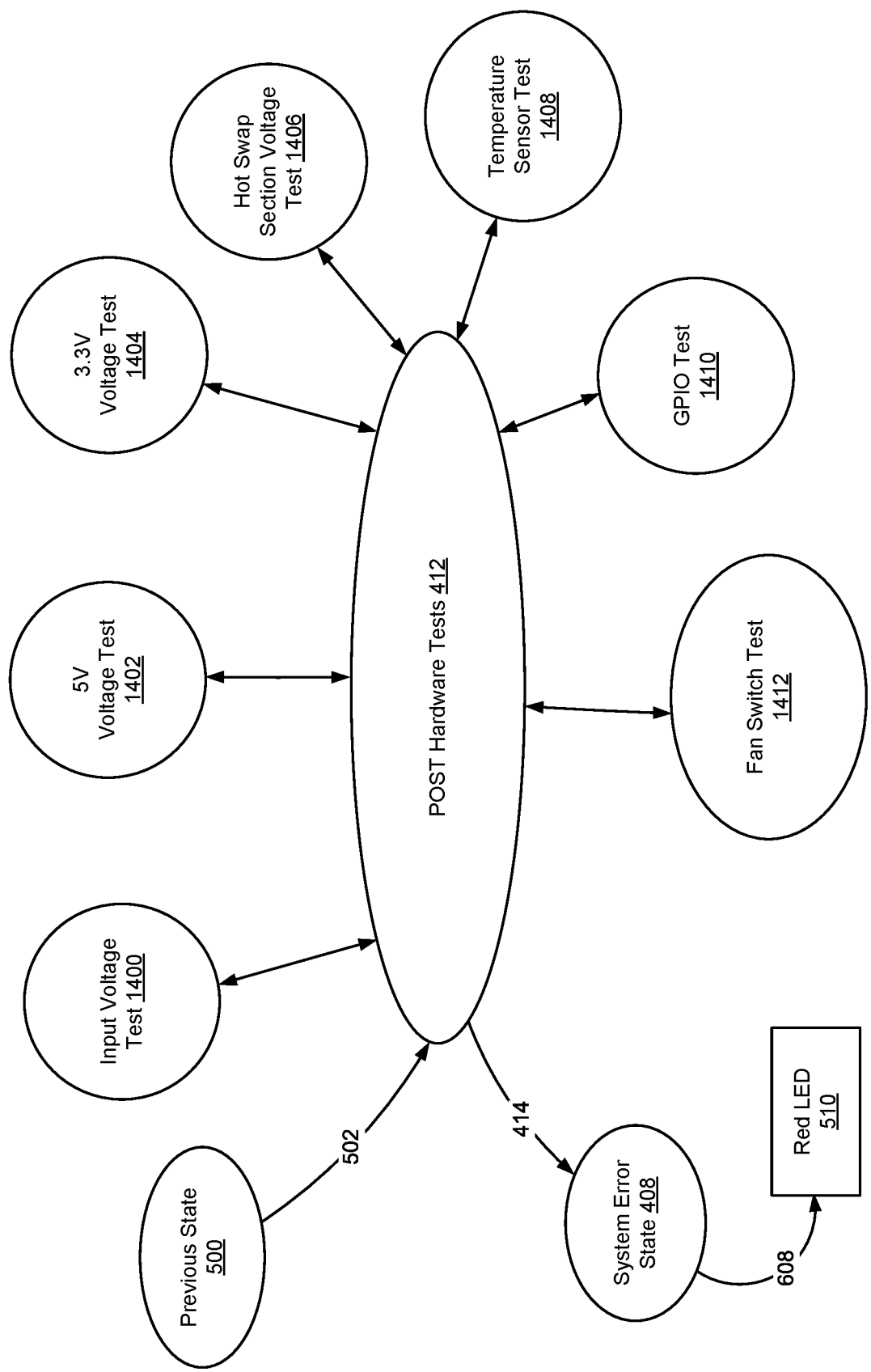
FIG. 14 is a functional block diagram illustrating POST hardware tests performed by the power controller according to some embodiments.

As shown in FIG. 4, in some embodiments, if all the software tests described in connection with FIG. 13 are OK, state transfer occurs (arrow 410) to state 412 where Power On Self-Test (POST) hardware tests occur. FIG. 14 shows an example set of POST hardware diagnostic tests 412 that are performed upon startup. In some embodiments, POST hardware diagnostic tests 412 are run just after power is applied to the electronics of base unit 12. In some embodiments, the code for these tests resides in EEPROM used to boot the system.

In some embodiments, the POST hardware diagnostic tests 412 include an input voltage test 1400, a 5V voltage test 1402, a 3.3V voltage test 1404, a hot swap section voltage test 1406, a temperature sensor test 1408, a GPIO test 1410, and a fan switch test 1412. If any POST hardware diagnostic test 412 fails, system state transfer occurs (arrow 414) to system error state 408 and the red LED will be turned on. In some embodiments, the results of the POST hardware diagnostic tests 412 are available via serial UART 216 on debug port 266.

During the input power test 1400, the input power voltage is tested using voltage sensors 262 via the ADC channel 202. The input voltage level is required to be within a defined range, otherwise the system will repeat the test for up to five times. If the input power test 1400 fails more than 5 times, system state transfer occurs (arrow 414) to error state 408.

During the 5V voltage test 1402, the 5V power supply is tested using voltage sensors 262 via the ADC channel 202. The voltage level is required to be within a tolerance of 5V to ensure proper operation of the electronics. The system will repeat the test for up to five times. If the 5V voltage test 1402 fails more than 5 times, system state transfer occurs (arrow 414) to error state 408.

During the 3.3V voltage test 1404, the 3.3V power supply is tested using voltage sensors 262 via the ADC channel 202. The voltage level is required to be within a tolerance of 3.3V to ensure proper operation of the electronics. The system will repeat the test for up to five times. If the 3.3V voltage test 1404 fails more than 5 times, system state transfer occurs (arrow 414) to error state 408.

The hot swap section voltage test 1406 detects the output voltage of the power management modules during system startup before the drive section. The software must be able to turn off the output voltage if the drive voltage is not within the intended voltage range. For example, in some embodiments the drive voltage has a minimum voltage level of 34V and maximum voltage level of 38V. The hot swap section voltage test 1406 tests the drive voltage levels and, if the drive voltage levels are not within the specified range, will repeat the test for up to five times. If the hot swap section voltage test 1406 fails more than 5 times, system state transfer occurs (arrow 414) to error state 408.

Similar tests are performed on the temperature sensor 1408, to test the integrity of the GPIO 1410, and to test the fan switch 1412. These tests have not been discussed in greater detail since they are generally known in the art. If any of these tests fail, system state transfer occurs (arrow 414) to error state 408.

As noted above, in some embodiments the status of the system is indicated using green LED 506, orange LED 906, and red LED 510. Different embodiments may use other manners of indicating the system state. For example, in some embodiments the base unit 12 may include a communication module to enable the state of the system to be remotely monitored.

The following TABLE I shows an example set of LED light patters that may be used to indicate system status. The particular manner of indicating system status using LEDs is a design choice and the invention is not limited to the use of this particular set of LED status indications.

TABLE I

| System Status | LED Color | Blink rate |
| --- | --- | --- |
| Class B test failure at system power up | Red | 2 seconds |
| Board diagnostics at system power up | Red | 2 seconds |
| Touch detection on track | Red | 1 second |
| Object detection on track | Red | 1 second |
| Short detection on track | Red | 1 second |
| Input voltage error (Low or High) | Red | 1 second |
| Normal operation | Green | No blink |
| Puck 18 removal from track 14 | Green | 1 second blink and stop |
| Output voltage error (Low or High) | Red | 1 second |
| Current consumption less than 280 watts | Green | No blink |
| Current consumption between 280-299 watts | Orange | No blink |
| Current consumption greater than 299 watts | Red | No blink |
| Temperature greater than 55° C. | Red | 1 second |

The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more non-transitory tangible computer-readable storage medium readable by the processor (including volatile and non-volatile memory and/or storage elements), one or more input devices, and/or one or more output devices. The processor thus may access one or more input devices to obtain input data, and may access one or more output devices to communicate output data. The computer program(s) may be implemented using one or more high level procedural or object-oriented programming languages to communicate with a computer system. The language may be compiled or interpreted.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Embodiments of the systems and methods described above comprise computer components and computer-implemented steps that will be apparent to those skilled in the art. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A power system for a floor power system, comprising:
   a power controller;
   an input power module for receiving AC power from a wall mains;
   a power driver electrically connected to the input power module to receive the AC power from the input power module, convert the AC power to low voltage DC power and medium voltage DC power, and selectively output either the low voltage DC power or medium voltage DC power under the control of power controller; and
   an output power module for selectively providing either the low voltage DC power or medium voltage DC power to a charging track of the floor power system, the charging track having exposed electrical contacts along an upper surface;
   wherein the power controller includes a microcontroller unit having software embedded therein to implement a control application, the control application comprising:
   a main function loop, a class B safety test task, a POST hardware diagnostic test task, a dither task, a power management task, and an object sensing task;
   wherein the dither task is configured to toggle the low voltage DC power on/off to the track under no load conditions, and sense conditions on the track during periods of time when the low voltage DC power is turned on to the track; and
   wherein the power management task is configured to toggle the medium voltage DC power on/off to the track under load conditions, and sense conditions on the track during periods of time when the medium voltage DC power is turned off to the track.

2. The power system of claim 1, wherein the main function loop comprises a state machine operable to cycle from a dither task initialization state, to a dither task no-load condition state, to a drive task initialization state, to a drive task load condition state, to a wait/fault state, and back to the dither task initialization state.

3. The power system of claim 2, wherein the state machine is operable to transition from the dither task no-load condition state to the wait/fault state if an object is sensed on the track while the main function loop is in the dither task no-load condition state.

4. The power system of claim 2, wherein the state machine is operable to transition from the dither task no-load condition state to the drive task load condition state if a connector is sensed on the track while the main function loop is in the dither task no-load condition state.

5. The power system of claim 2, wherein, while in the dither task no-load condition state, the power controller controls the power driver to drive the low voltage DC power on the track to check for the presence of a connector by iteratively turning the low voltage DC power on for a first ON period and then turning the low voltage DC power off for a second OFF period, and sensing electrical characteristics of the track during the OFF periods.

6. The power system of claim 2, wherein, while in the drive task load condition state, the power controller controls the power driver to drive the medium voltage DC power on the track to check for the presence of a connector, an object, or a human touch, by iteratively turning the medium voltage DC power on for a first ON period and then turning the medium voltage DC power off for a second OFF period, and sensing electrical characteristics of the track during the OFF periods.

7. The power system of claim 2, wherein the state machine is operable to transition from the drive task load condition state to the wait/fault state if an object or a human touch is sensed on the track while the main function loop is in the drive task load condition state; and
   wherein the state machine is operable to remain in the wait/fault state for a wait period and then transition to the dither task no-load condition state.

8. The power system of claim 7, wherein the state machine is operable to remain in the wait/fault state for a first wait period when an object is sensed on the track and is operable to remain in the wait/fault state for a second wait period if the human touch is sensed on the track, wherein the first wait period is a different amount of time than the second wait period.

9. The power system of claim 7, wherein the state machine further comprises a system error state, and wherein the state machine is operable to transition from the drive task load condition state to the system error state if the object has been sensed on the track for a predetermined number of contiguous state cycles greater than one.

10. The power system of claim 2, wherein the state machine is operable to transition from the drive task load condition state to the wait/fault state if an overcurrent condition is sensed on the track while the main function loop is in the drive task load condition state; and
    wherein the state machine is operable to remain in the wait/fault state for a wait period and then transition to the dither task no-load condition state.

11. The power system of claim 10, wherein the state machine further comprises a system error state, and wherein the state machine is operable to transition from the drive task load condition state to the system error state if the overcurrent condition has been sensed on the track for a predetermined number of contiguous state cycles greater than one.

12. The power system of claim 2, wherein the state machine is operable to transition from the drive task load condition state to the wait/fault state if a voltage irregularity is sensed in the power system while the main function loop is in the drive task load condition state; and
    wherein the state machine is operable to remain in the wait/fault state for a wait period and then transition to the dither task no-load condition state.

13. The power system of claim 12, wherein the state machine further comprises a system error state, and wherein the state machine is operable to transition from the drive task load condition state to the system error state if the voltage irregularity has been sensed in the power system for a predetermined number of contiguous state cycles greater than one.

14. The power system of claim 12, wherein the voltage irregularity is a low or high input voltage at the input power module.

15. The power system of claim 12, wherein the voltage irregularity is a low or high output voltage at the output power module.

16. The power system of claim 2, wherein the main function loop further comprises a system idle state, and wherein the state machine is operable to transition from any one of the other states to the system idle state upon detection of a high temperature of the power system.

17. The power system of claim 2, wherein the main function loop further comprises a system error state, and wherein the state machine is operable to remain in system error state until power to the power system has been turned off and then turned back on.

18. A floor power system, comprising:
- a charging track having exposed electrical contacts along an upper surface; and
- a power system electrically connected to the electrical contacts of the charging track, the power system comprising:
- a power controller;
- an input power module for receiving AC power from a wall mains;
- a power driver electrically connected to the input power module to receive the AC power from the input power module, convert the AC power to low voltage DC power and medium voltage DC power, and selectively output either the low voltage DC power or medium voltage DC power under the control of the power controller; and
- an output power module for selectively providing either the low voltage DC power or medium voltage DC power to the electrical contacts of the charging track;
- wherein the power controller includes a microcontroller unit having software embedded therein to implement a control application, the control application comprising:
- a main function loop, a class B safety test task, a POST hardware diagnostic test task, a dither task, a power management task, and an object sensing task;
- wherein the dither task is configured to toggle the low voltage DC power on/off to the track under no load conditions, and sense conditions on the track during periods of time when the low voltage DC power is turned on to the track; and
- wherein the power management task is configured to toggle the medium voltage DC power on/off to the track under load conditions, and sense conditions on the track during periods of time when the medium voltage DC power is turned off to the track.

* * * * *